US008662313B2

(12) United States Patent
Arevalo et al.

(10) Patent No.: US 8,662,313 B2
(45) Date of Patent: Mar. 4, 2014

(54) SYSTEMS AND METHODS FOR PROCESSING COMESTIBLES

(75) Inventors: Pedro Armando Arevalo, Los Angeles, CA (US); Glenn A Shelton, Los Angeles, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 216 days.

(21) Appl. No.: 13/187,396

(22) Filed: Jul. 20, 2011

(65) Prior Publication Data

US 2013/0019758 A1    Jan. 24, 2013

(51) Int. Cl.
B07C 5/00      (2006.01)
B65G 15/14     (2006.01)

(52) U.S. Cl.
USPC .......................... 209/552; 209/923; 198/605

(58) Field of Classification Search
USPC ............ 209/586, 657, 923, 939; 99/334, 337, 99/339, 349, 357, 467, 477, 486, 386, 99/443 C; 198/603, 605
See application file for complete search history.

(56) References Cited

U.S. PATENT DOCUMENTS

| | | |
|---|---|---|
| 1,885,935 A | 11/1932 | Mcallister |
| 2,525,348 A | 10/1950 | Glass |
| 2,642,177 A | 6/1953 | Glaze et al. |
| 2,709,412 A | 5/1955 | Eagerman |
| 2,799,384 A | 7/1957 | Rutherford |
| 2,822,942 A | 2/1958 | Lanham |
| 2,878,776 A | 3/1959 | Vogel |
| 3,106,291 A | 10/1963 | Tisch |
| 3,321,807 A | 5/1967 | O'Brien |
| 3,348,680 A | 10/1967 | Matthews et al. |
| 3,379,141 A | 4/1968 | Groth |
| 3,382,530 A | 5/1968 | Glesner |
| 3,397,655 A | 8/1968 | Groth |
| 3,398,679 A | 8/1968 | Grivet |
| 3,469,690 A | 9/1969 | Ervin |
| 3,478,704 A * | 11/1969 | Ford .............................. 426/502 |
| 3,565,015 A | 2/1971 | Jorgensen |
| 4,116,119 A | 9/1978 | Kuhlman |
| 4,208,574 A | 6/1980 | Schafer |
| 4,430,915 A | 2/1984 | Rutherford |
| 4,546,886 A | 10/1985 | Churchland |

(Continued)

FOREIGN PATENT DOCUMENTS

| | | |
|---|---|---|
| EP | 0323565 | 7/1989 |
| EP | 520136 | 12/1992 |

(Continued)

OTHER PUBLICATIONS

PCT/US2009/042519 International Search Report and Written Opinion of International Searching Authority, ISA European Patent Office, mailed Apr. 27, 2010, 11 pages.

(Continued)

*Primary Examiner* — Joseph C Rodriguez
(74) *Attorney, Agent, or Firm* — Fish & Richardson P.C.

(57) ABSTRACT

In some implementations, a cooler reduces the temperature of pressed dough balls after the pressed dough balls have been baked in an oven. The cooler may include multiple cooling conveyors arranged in a vertical stack with adjacent conveyors transferring the pressed dough balls in opposite directions. The cooler may include a safety release turnaround between each of the adjacent cooling conveyors to move the pressed dough balls between the adjacent conveyors in the cooler.

20 Claims, 10 Drawing Sheets

(56) References Cited

U.S. PATENT DOCUMENTS

| | | | |
|---|---|---|---|
| 4,651,881 A | 3/1987 | Wallin | |
| 4,683,813 A | 8/1987 | Schultz | |
| 4,751,876 A * | 6/1988 | Escamilla | 99/353 |
| 4,769,106 A | 9/1988 | Busching | |
| 4,776,789 A | 10/1988 | Ehrich | |
| 4,899,869 A | 2/1990 | Johnson | |
| 4,905,581 A | 3/1990 | Kirkpatrick | |
| 4,938,126 A | 7/1990 | Rubio et al. | |
| 5,006,358 A | 4/1991 | Ribio et al. | |
| 5,118,515 A | 6/1992 | Montemayor et al. | |
| 5,139,801 A | 8/1992 | Montemayor et al. | |
| 5,158,132 A | 10/1992 | Guillemot | |
| 5,160,377 A | 11/1992 | Montemayor et al. | |
| 5,231,919 A | 8/1993 | Lawrence et al. | |
| RE34,530 E | 2/1994 | Kirkpatrick | |
| 5,300,170 A | 4/1994 | Donohoe | |
| 5,388,503 A | 2/1995 | Buerkle | |
| 5,392,696 A | 2/1995 | Navarro et al. | |
| 5,400,909 A | 3/1995 | Tomat | |
| 5,564,554 A | 10/1996 | Lawrence | |
| 5,592,870 A | 1/1997 | Sanchez | |
| 5,630,358 A | 5/1997 | Patel | |
| 5,635,235 A | 6/1997 | Sanchez | |
| 5,649,473 A | 7/1997 | Lawrence | |
| 5,749,283 A | 5/1998 | Funk | |
| 5,879,734 A | 3/1999 | Broyles | |
| 5,918,533 A | 7/1999 | Lawrence et al. | |
| 5,931,083 A | 8/1999 | Lawrence et al. | |
| 5,964,144 A | 10/1999 | Chapa | |
| 5,979,302 A | 11/1999 | Funk et al. | |
| 5,996,476 A | 12/1999 | Schultz | |
| 6,026,738 A | 2/2000 | Charles et al. | |
| 6,083,083 A | 7/2000 | Nishimura | |
| 6,112,647 A | 9/2000 | Brunner et al. | |
| 6,244,941 B1 | 6/2001 | Bowman et al. | |
| 6,250,217 B1 | 6/2001 | Korybutiak | |
| 6,302,767 B1 | 10/2001 | Tietz | |
| 6,361,307 B1 * | 3/2002 | Bernhard et al. | 425/193 |
| 6,382,427 B1 | 5/2002 | Nakhei-Nejad | |
| 6,398,539 B1 | 6/2002 | Lawrence | |
| 6,439,366 B1 | 8/2002 | Matkovich | |
| 6,638,553 B2 | 10/2003 | Bell et al. | |
| 6,835,118 B2 | 12/2004 | Berkstresser et al. | |
| 6,951,451 B2 | 10/2005 | Schultz | |
| 7,067,167 B2 | 6/2006 | Damsgard et al. | |
| 7,086,325 B2 | 8/2006 | Armstrong | |
| 7,097,026 B2 | 8/2006 | Lawrence | |
| 7,134,543 B2 | 11/2006 | Barry et al. | |
| 7,228,972 B2 | 6/2007 | Ghosh | |
| 7,229,270 B2 | 6/2007 | Schultz | |
| 7,264,107 B2 | 9/2007 | Lawrence | |
| 7,325,483 B2 | 2/2008 | Szymanski | |
| 8,167,114 B2 * | 5/2012 | Khanania | 198/499 |
| 2003/0143309 A1 | 7/2003 | Kindie et al. | |
| 2003/0232103 A1 | 12/2003 | Marino et al. | |
| 2004/0191378 A1 | 9/2004 | Golby et al. | |
| 2004/0211323 A1 | 10/2004 | Heinzen et al. | |
| 2004/0241267 A1 | 12/2004 | Schultz | |
| 2005/0287240 A1 | 12/2005 | Mattias et al. | |
| 2007/0023257 A1 | 2/2007 | Schiesser | |
| 2007/0045232 A1 | 3/2007 | Murai et al. | |
| 2009/0208892 A1 * | 8/2009 | Kozman et al. | 432/146 |
| 2009/0272277 A1 | 11/2009 | Lawrence | |

FOREIGN PATENT DOCUMENTS

| | | |
|---|---|---|
| EP | 1219174 | 7/2002 |
| EP | 1609364 | 12/2005 |
| EP | 1670702 | 12/2010 |
| GB | 1109887 | 4/1968 |
| GB | 1416875 | 12/1975 |
| GB | 2393895 | 4/2004 |
| JP | 01-196248 | 8/1989 |
| JP | 07-143841 | 6/1995 |
| WO | WO 96/16583 | 6/1996 |
| WO | WO 2008/118026 | 10/2008 |
| WO | WO 2009/135123 | 11/2009 |

OTHER PUBLICATIONS

CasaHerrera, CH-51 Automated Inspection Systems, [Online], Retrieved from the Internet at http://www.casaherrera.com/machine-tortilla-flatbread-automated-inspection-systems on Nov. 9, 2010, 3 pages.

CasaHerrera, CH-51 Automated Inspection Systems [Online],Retrieved from the Internet at http://www.casaherrera.com/machine-tortilla-flatbread-automated-inspection-systems on Nov. 9, 2010, 2 pages.

* cited by examiner

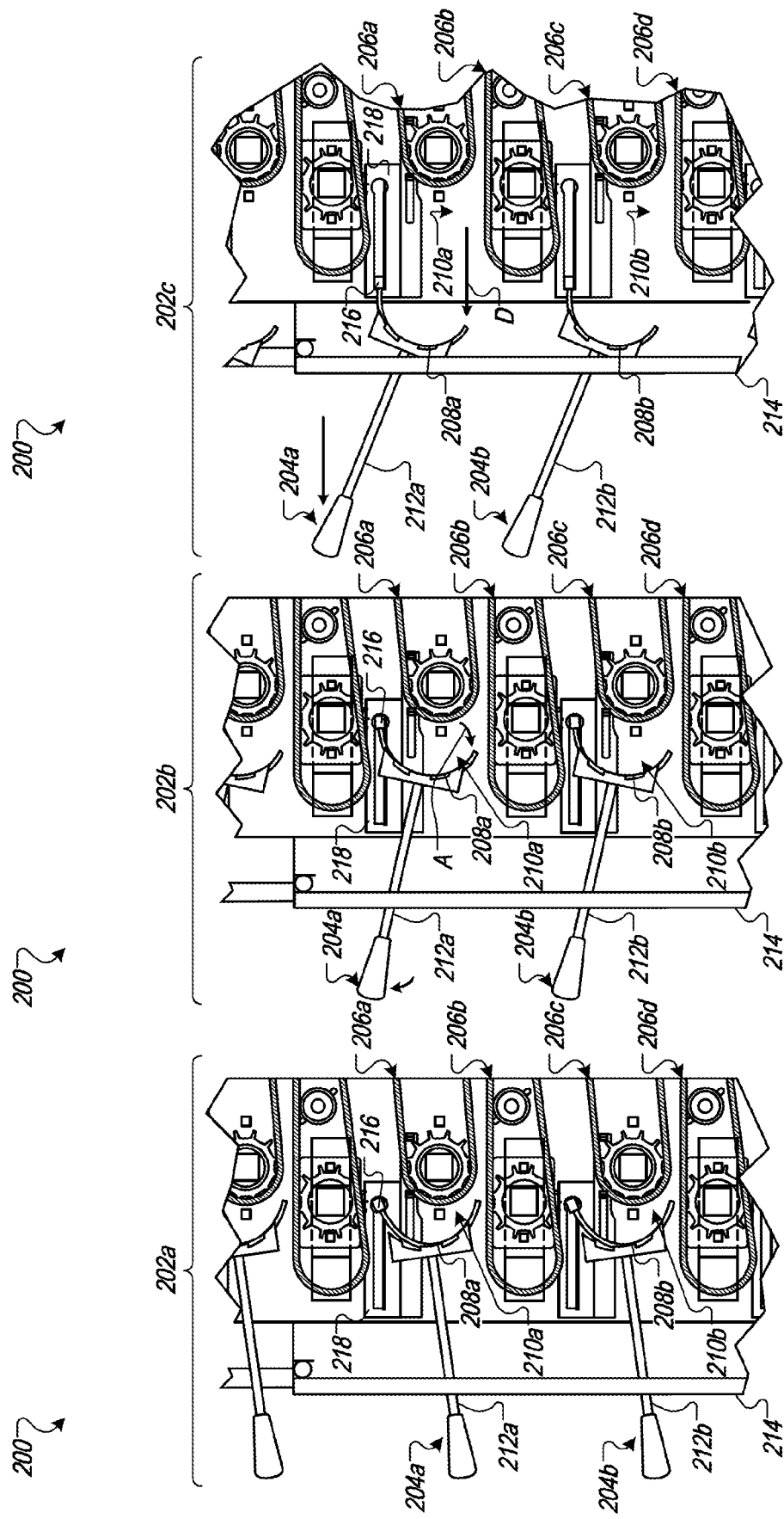

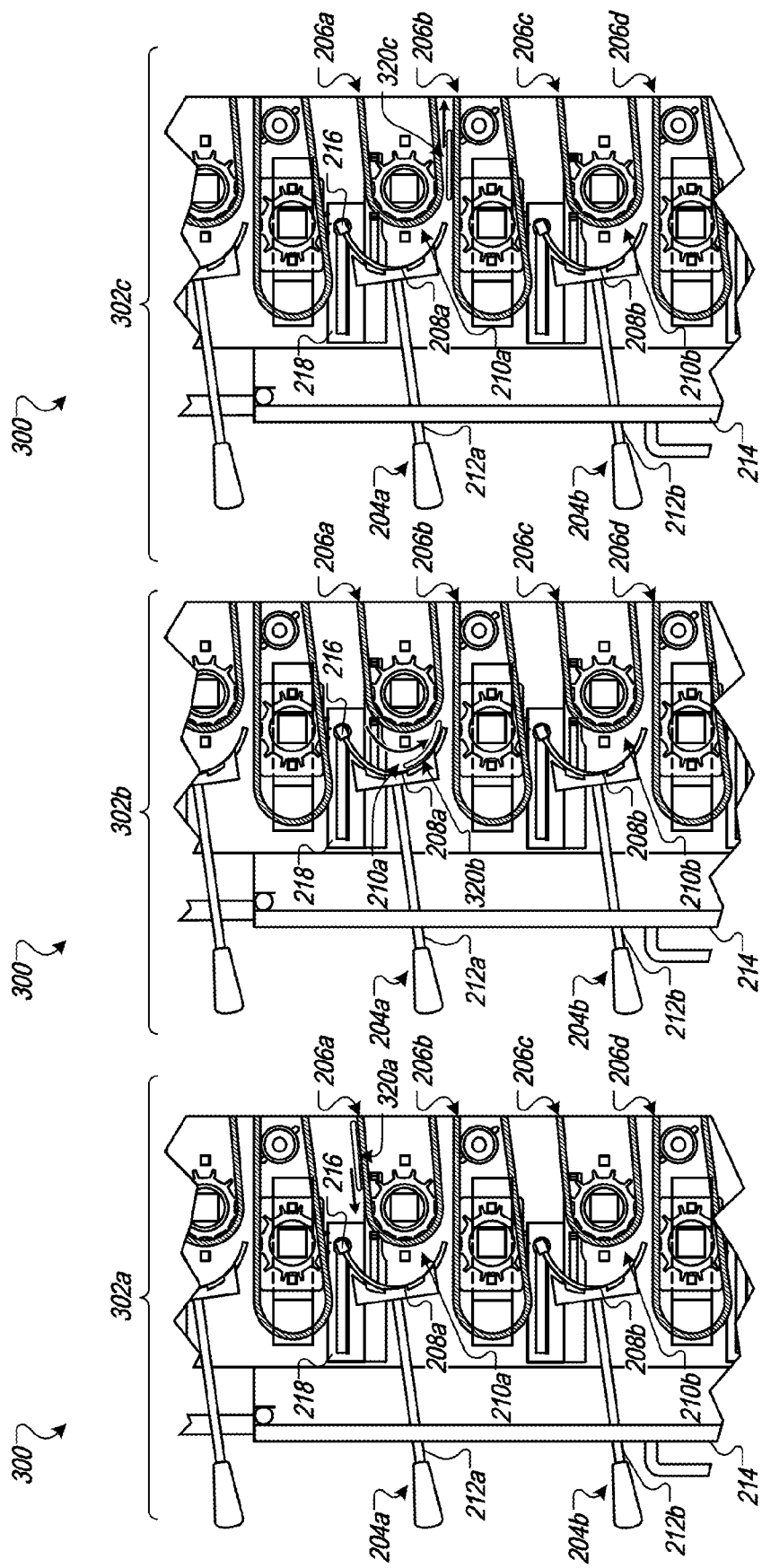

SYSTEMS AND METHODS FOR PROCESSING COMESTIBLES

BACKGROUND

Flatbread is made from flour, water, and salt and formed into flattened dough before baking. Some flatbreads include additional ingredients such as curry powder, black pepper, olive oil, or sesame oil. The thickness of the flattened dough can range from one thirty-second of an inch to over an inch thick.

Flatbreads are made by hand or with automated equipment. For example, a factory or a production line can be used to produce one or more types of flatbread to reduce the cost of making the bread. One automated method of forming flatbread includes pressing flatbread dough.

Factories can include different types of tools for the different stages in the production process, such as a mixer, an oven, and a cooler. Some production lines have a tool to form flatbread dough into a ball and another tool to flatten the dough before baking. The flattened dough has a circular shape and a specific thickness so the flatbread will have a desired thickness after baking.

For example, a pressing apparatus presses a ball of dough until the pressed dough ball has a certain diameter. After the pressure is released from the pressed dough ball, the diameter of the pressed dough ball sometimes decreases due to elasticity of the dough. Changes to different process parameters, such as a heating temperature during pressing and the ingredients in the dough, sometimes have an effect on the diameter of the dough after pressing is completed. For example, a higher pressing temperature can help a pressed dough ball retain its shape.

SUMMARY

In some implementations, a cooler reduces the temperature of pressed dough balls after the pressed dough balls have been baked in an oven. The cooler may include multiple cooling conveyors arranged in a vertical stack with adjacent conveyors transferring the pressed dough balls in opposite directions. The cooler may include a safety release turnaround between each of the adjacent cooling conveyors to move the pressed dough balls between the adjacent conveyors in the cooler.

In certain implementations, the safety release turnarounds can be repositioned to relieve a jam from the cooling conveyors without requiring the conveyors to be stopped. For example, an individual safety release turnaround may be moved from an operating position to a retracted position to discharge one or more comestibles that are stuck in the cooler while the cooling conveyors continue to move. Alternatively, multiple safety release turnarounds can be repositioned to release a jam at approximately the same time while the cooling conveyors continue to move.

In some implementations, the comestibles discharged from the cooler are transferred by a discharge conveyor to another area in the factory housing the production line. For example, the discharge conveyor can be positioned at one end of the cooler below the cooling conveyors. When one or more of the safety release turnarounds are retracted, the comestibles causing a jam can fall onto the discharge conveyor.

In various implementations, the cooler includes a barrier between the cooler and the environment housing the cooler. For example, doors can be bolted or interlocked to the ends and sides of the cooler. The barriers can permit repositioning of the safety release turnarounds to relieve a jam in the cooler without opening or removing the barriers. The barriers can protect the conveyors and the interior of the cooler from potential damage caused by entry of foreign objects, or human interaction and allow access to the cooler for maintenance to the interior of the cooler when the cooler is shut down.

In some implementations, the cooler includes one or more sensors that provide input to a controller that can automatically trigger the opening of a safety release turnaround to prevent a jam in the cooling conveyors. For example, at least one sensor can monitor the size of pressed dough balls on a conveyor. For example, a camera can be located within the cooler to monitor pressed dough balls on the cooling conveyors. As a second example, a camera can be located outside of the cooler and monitor pressed dough balls on a conveyor positioned before the cooler. When the controller, based on input from the one or more sensors, determines that a pressed dough ball exceeds a predetermined size (e.g., that can pass unimpeded through a safety release turnaround), an upcoming safety release turnaround may be pivoted and retracted by the controller in advance of the pressed dough ball reaching the safety release turnaround to allow discharge of the incorrectly sized dough ball prior to a jam occurring in the safety release turnaround.

In certain implementations, the cooler includes one or more sensors that provide output, which is used to determine if one or more safety release turnarounds should be opened so that a jam can be removed from the cooler or prevented. For example, a camera can monitor the time between the consecutive pressed dough balls moving along the conveyor system. When a controller determines that the predetermined time interval has passed without the presence of a pressed dough ball appearing in the field of view of the camera, a specific safety release turnaround or a group of safety release turnarounds can be pivoted and retracted to remove a detected jam in the cooler.

The details of one or more implementations are set forth in the accompanying drawing and description below. Other features, objects, and advantages will be apparent from the description and drawings, and from the claims.

DESCRIPTION OF DRAWINGS

FIGS. 2A-C illustrate an example of a system with multiple conveyors.

FIGS. 3A-C illustrate an example of a pressed dough ball moving through a system.

Like reference symbols in various drawing indicate like elements.

DETAILED DESCRIPTION OF ILLUSTRATIVE IMPLEMENTATIONS

Figure 1A:
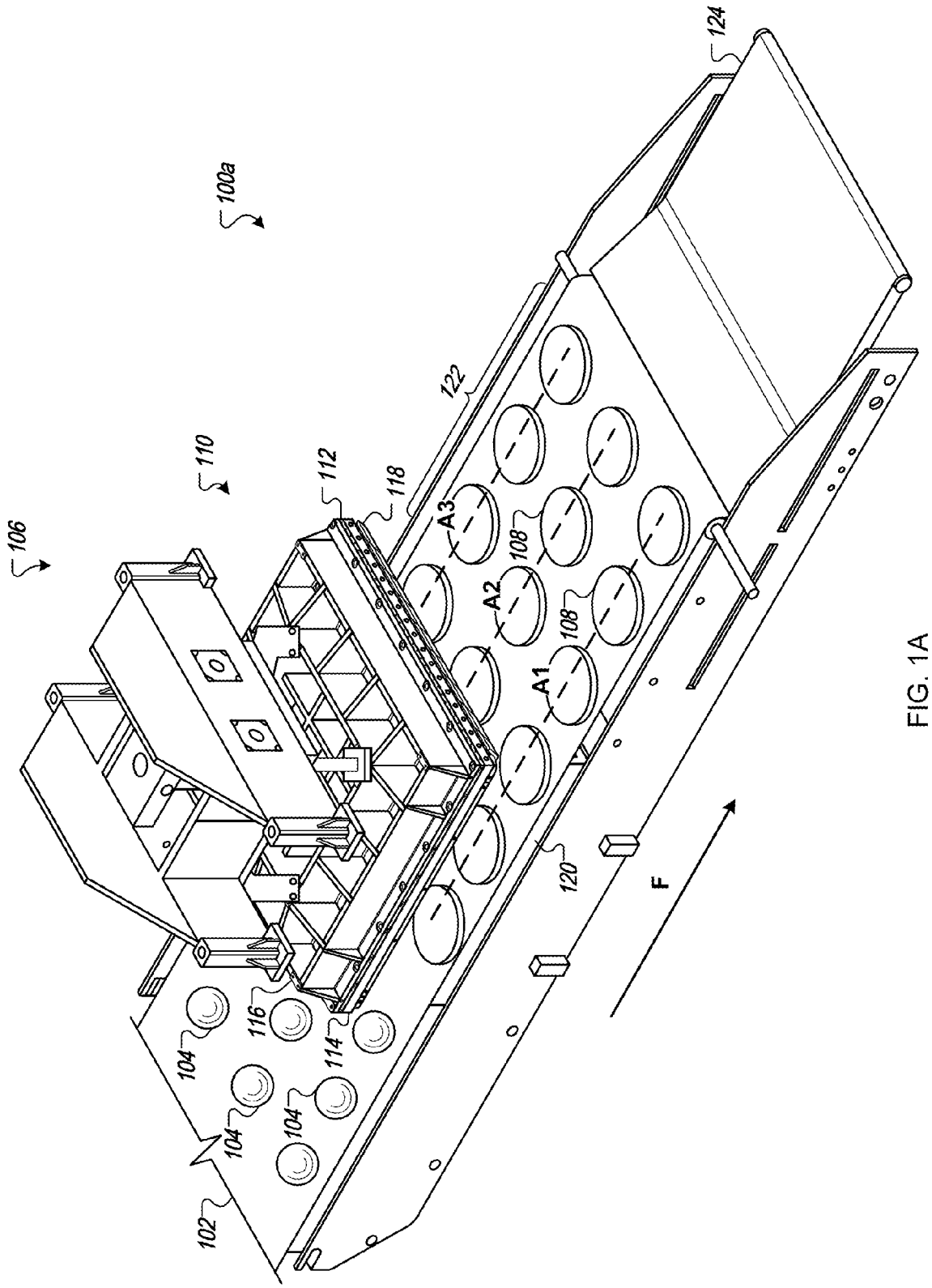
FIGS. 1A-D illustrate an example of part of a production line.

A comestible or flatbread production line includes a cooler that lowers the temperature of comestibles after the comestibles are baked in an oven. The cooler includes multiple cooling conveyors stacked above each other in the vertical direction and a safety release turnaround between each of the adjacent cooling conveyors. The cooling conveyors cool comestibles to a predetermined temperature (e.g., ambient temperature), while the safety release turnarounds guide the comestibles between the adjacent conveyors in the cooler.

Sometimes a safety release turnaround may become jammed and passage of comestibles subsequently arriving at the safety release turnaround is impeded. For example, a comestible with a thickness exceeding a width of a turnaround area between the conveyor belt and the safety release turnaround can become jammed in the turnaround area.

To remove the jam, the associated safety release turnaround is rotated and retracted to allow the comestible to fall out of the cooler. For example, the safety release turnaround is rotated away from a top surface of the bottom conveyor and retracted, in a drawer open-close motion, to permit a jammed comestible to fall out of the cooler (e.g., onto a discharge conveyor). When the safety release turnaround is returned to an operating position from the rotated and retracted position, subsequent comestibles pass through the safety release turnaround unimpeded.

A safety release turnaround allows the cooler to continue to run while a jam is removed from the cooling conveyors, reducing the downtime of the cooler. For example, the conveyors continue moving while a safety release turnaround is opened to allow the jam to be removed from the cooler and comestibles to continue to move through the production line and the cooler.

Allowing the cooler to continue operating while a jam is removed from the cooler allows other systems further up the production line to continue operating. For example, an oven and/or a pressing station, that process comestibles before the comestibles reach the cooler, continue to operate while a jam is removed from the cooler. Shutting down the cooler to allow a jam to be removed would change the processing parameters of the comestibles, for example changing a pressing time at a pressing station potentially allowing pressed comestibles to return to more of an original shape and/or a baking time in an oven potentially over or under baking the comestibles. As another example, when a safety release turnaround is located in system of a production line (e.g., an oven) all systems in a production line containing the system are able to continue operating while a jam is removed from the system, reducing the downtime of the production line.

In certain implementations, allowing the production line to continue processing comestibles while removing a jammed comestible reduces the number of comestibles that need to be rejected from the system based on parameters associated with the recipe used by the production line. For example, if a comestible is overbaked, the comestible would need to be removed from the system because the overbaked comestible may not be desirable for consumers.

In some implementations, a safety release turnaround reduces the occurrence of jams in the conveyor system. For example, a camera can provide images to a controller that monitors comestibles passing through the cooler. The controller can instruct an actuator to automatically reposition a safety release turnaround to prevent a jam from occurring in a safety release turnaround. In one example, the controller can detect incorrectly formed comestibles that may cause a jam by monitoring for comestibles with a diameter less than a predetermined recipe value. Since the diameter of a comestible is inversely proportional to the thickness of the comestible, the controller uses the diameter information to identify a comestible that has a thickness greater than an allowable thickness for the cooler, where the comestible may cause a jam in the cooler if the comestible moves through the cooler.

In certain implementations, an actuator moves a safety release turnaround automatically, based on input from a controller, to remove a jam that has occurred in the cooler. For example, a camera monitoring comestibles passing through the cooler provides images of the cooler to a controller. The controller detects the absence of comestibles in a certain location of the cooler and identifies a safety release turnaround that may have a jam. For example, the controller determines that no comestibles have passed through the certain location of the cooler for a time period greater than a predetermined period of time. The controller automatically instructs an actuator to reposition the identified safety release turnaround to a rotated and retracted position to remove the jam. Alternatively, the controller instructs multiple actuators to reposition two or more of the safety release turnarounds to remove the jam from the cooler FIG. 1A is an example of a dough pressing apparatus 100*a*. The dough pressing apparatus 100*a* includes a conveyor 102 that receives one or more balls of dough 104 (e.g., with a width between about 1.5 to about 4.0 inches). The balls of dough 104 are placed on the conveyor 102 by a loading station or another conveyor (not shown). The temperature of the conveyor 102 is the same as the ambient environment around the dough pressing apparatus 100*a*.

A pattern of dough balls is placed on the conveyor 102 so that each of the individual balls of dough aligns with a pressing surface of a pressing station 106. For example, three longitudinal columns of the balls of dough 104 are placed on the conveyor 102 to align approximately with three longitudinal axes A1-3 of the dough pressing apparatus 100*a*.

The conveyor 102 moves the pattern of dough balls into the pressing station 106, which presses the balls of dough 104 and forms a plurality of pressed dough balls 108. In some implementations, the pressure used at the pressing station 106 is adjusted based on the actual diameters of the pressed dough balls 108 if a number of the pressed dough balls 108 have a diameter that is smaller or larger than the desired diameter. For example, if there are nine balls of dough in a press cycle, and six of the pressed dough balls 108 have an actual diameter that is smaller than the desired diameter, the pressure used by the pressing station can be increased so that the diameters of the pressed dough balls 108 increases.

In certain implementations, some of the balls of dough 104 are not pressed or are not sufficiently pressed in order to prevent the ball of dough from creating a jam in a production line that includes the dough pressing apparatus 100*a*. For example, if the loading station places a pattern of dough balls on the conveyor 102 that is missing some of the dough balls in the pattern, the pressing station 106 does not press the pattern of dough balls. Alternatively, the pressing station 106 does not completely press a pattern of dough balls according to recipe specifications when a dough ball is missing from the pattern of dough balls. In another example, one or more of the balls of dough 104 in the pattern may be malformed or smaller than a recipe size required for the balls of dough 104.

In one example, pressing a pattern of dough balls where one or more of the dough balls is missing or incorrectly formed may create an asymmetrical load on the frame of the pressing station 106. In some implementations, the pressing station 106 does not press or completely press the pattern of dough balls in order to prevent the asymmetrical load on the frame of the pressing station 106, which may cause extra wear or damage to the pressing station 106 and/or the conveyor 102.

In some implementations, the conveyor 102 moves one or more non-pressed or non-formed dough balls (e.g., the balls of dough 104) past the pressing station 106 before the non-pressed dough balls are pressed at the pressing station 106. For example, another conveyor (not shown) feeds the balls of dough 104 onto the conveyor 102 and the conveyor 102 moves one or more of the balls of dough 104 past the pressing station 106. In one example, the conveyor 102 moves one or more latitudinal rows of the balls of dough 104 past the pressing station 106 while aligning balls of dough with the pressing station 106 (e.g., because of a missing or incorrectly sized ball of dough).

The pressing station 106 optionally includes one or more sensors (e.g., a photoeye or camera) which detect a missing or incorrectly formed dough ball. When one of the sensors detects a missing or incorrectly formed dough ball, a controller can provide a signal to the pressing station 106 so that the pressing station does not press or completely press the pattern of dough balls.

The pressing station 106 includes an upper pressing platen 110 that applies pressure downward on the balls of dough 104. The upper pressing platen 110 includes an upper insulator 112, an upper pressing plate 114, and an upper portion 116. The upper insulator 112 and the upper pressing plate 114 are mounted to the upper portion 116 with non-conductive bolts.

The upper insulator 112 provides thermal insulation so that heat from the upper pressing plate 114 does not pass into the upper portion 116 of the upper pressing platen 110. The upper insulator 112 is made from thermalate, such as Thermalate® H330 manufactured by Haysite. The upper insulator 112 has a maximum service temperature between about 500 to about 1000° F., preferably between about 500 to about 850° F., more preferably between about 550 to about 800° F.

The upper insulator 112 has a compressive strength between about 17,000 to about 49,000 PSI, preferably between about 26,200 to about 49,000 PSI, more preferably between about 26,200 to about 44,000 PSI. In some implementations, the upper insulator 112 is composed of glastherm, such as Glastherm® HT or Cogetherm® manufactured by Glastic Corporation.

The upper insulator 112 and the upper pressing plate 114 are square with a length and a width between about 12 to about 72 inches, preferably between about 15 to about 60 inches. In certain implementations, the upper insulator 112 has a rectangular shape. In some implementations, the upper insulator 112 and the upper pressing plate are square with a width and length between about 37 to about 42 inches. The upper insulator 112 has a thickness between about 0.5 to about 2 inches, preferably between about 0.75 to about 1.75 inches, more preferably about 0.75 inches. The size and shape of the upper insulator 112 and/or the upper pressing plate 114 is determined by the production line housing the dough pressing apparatus 100a and the process recipes used in the production line.

The upper pressing plate 114 includes one or more heating channels (not shown). The heating channels include one or more heating elements that increase the temperature of the upper pressing plate 114 during processing. In some implementations, a heating fluid, such as a liquid or a gas, flows through the heating channels in order to heat the upper pressing plate. For example, Argon gas passes through the heating channels and heats the upper pressing plate 114 to a temperature between about 150 to about 750° F., preferably between about 250 to about 550° F., more preferably between about 300 to about 400° F. The temperature of the upper pressing plate 114 is determined based on a process recipe used by the dough pressing apparatus 100a.

The thickness of the upper pressing plate 114 is selected based on the pressure applied to the balls of dough 104 and the temperature required to heat the balls of dough 104 during processing. For example, the upper pressing plate 114 has a thickness between about 1 to about 5 inches, preferably between about 1.5 to about 3 inches. For example, the finished thickness of the upper pressing plate 114 can be about 2.974 inches.

In some implementations, the thickness of the upper pressing plate 114 is selected based on the composition of the upper pressing plate 114. For example, when the upper pressing plate 114 is made from graphene, the upper pressing plate 114 is thinner than if the upper pressing plate 114 was made from gold.

The upper pressing plate 114 is made from a material with a high thermal conductivity. The upper pressing plate 114 has a thermal conductivity between about 5 to about 5500 W/(m*K), preferably between about 15 to about 2500 W/(m*K), more preferably between about 30 to about 500 W/(m*K). The thermal conductivity of the upper pressing plate 114 can be selected based on the process recipes used in the dough pressing apparatus 100a, the composition of the upper pressing plate 114, and/or a desired efficiency of the upper pressing plate 114.

In some implementations, the composition of the upper pressing plate 114 is selected based on the resistance of the material to wear or scratches. For example, stainless steel is used to increase hardness (e.g., durability) and corrosion resistance of the upper pressing plate 114. The increased hardness of stainless steel decreases scratches and dents made to the upper pressing plate 114.

In some implementations, the upper pressing plate 114 is manufactured from aluminum or an aluminum alloy in order to have high wear resistance, a light mass, and a reduced heating time (e.g., based on a thermal conductivity of about 120 to about 237 W/(m*K)). The upper pressing plate 114 can be made from ceramic material in order to withstand high processing temperatures without deforming (e.g., up to about 3,000° F.) and have a high wear resistance. Brass can be used for the upper pressing plate 114 based on the low friction of brass materials and good thermal conductivity (e.g., about 109 W/(m*K)).

The upper pressing platen 110 includes a skin 118 that protects the bottom surface of the upper pressing plate 114 from wear caused by heat and/or pressure during processing of the balls of dough 104. The skin 118 is attached to the upper pressing platen 110 using vacuum suction. Alternatively, the skin 118 is attached to the upper pressing platen 110 using bolts or clamps.

A pressure between about 3 to about 70 PSI is applied to the upper pressing platen 110 to press a bottom surface of the skin 118 against the balls of dough 104, preferably between about 5 to about 65 PSI. In some implementations, a pressure between about 9 to about 50 PSI is applied to the upper pressing platen 110.

The pressing station 106 uses different pressures based on the desired diameter of the pressed dough balls 108. For example, a higher pressure (e.g., 48 PSI) is used to create pressed dough balls with a larger diameter (e.g., 12 inches) and a lower pressure (e.g., 13 PSI) is used to create pressed dough balls with a smaller diameter (e.g., 5 inches).

The diameter of the pressed dough balls 108 is inversely proportional to the thickness of the pressed dough balls 108. For example, increasing the diameter of a specific pressed dough ball decreases the thickness of the specific pressed dough ball. In one example, a ball of dough with a specific volume has a diameter of 10 inches and a thickness of ¼ inches, and a ball of dough with the same volume and an 8 inch diameter has a thickness of 25/64 inches.

The pressing station 106 includes a lower pressing platen 120. The lower pressing platen 120 applies pressure to the balls of dough 104 from below during processing. For example, the lower pressing platen 120 supports the balls of dough 104 on the conveyor 102 while the upper pressing platen 110 presses down on the top surface of the balls of dough 104.

The lower pressing platen 120 includes a lower pressing plate, a lower insulator, and a lower portion (not shown) similar to the upper pressing plate 114, the upper insulator 112, and the upper portion 116 respectively. For example, both the lower pressing plate and the upper pressing plate 114 are manufactured from stainless steel.

In some implementations, the lower pressing plate has a lower temperature than the upper pressing plate 114 in order to reduce the likelihood that a ball of dough will stick to the skin 118 after being pressed. For example, the pressed dough balls 108 are more likely to stick to a cooler surface, so the temperature of the lower pressing plate is less than the temperature of the upper pressing plate 114 and the skin 118 so that the pressed dough balls 108 will rest on the conveyor 102 after processing instead of sticking to the skin 118 and lifting off the conveyor 102.

For example, the lower pressing plate has a temperature between about 150 to about 750° F., preferably between about 250 to about 550° F., more preferably between about 300 to about 400° F. In one example, when the upper pressing plate 114 has a temperature of around 350° F., the skin 118 has a temperature of around 340° F., and the lower pressing plate has a temperature of around 325° F.

The dough pressing apparatus 100a is configured to process different recipes for different types of dough, different sizes of dough, and/or different shapes of dough. For example, different recipes can have a different press cycle layout or pattern of dough balls, such as a square 2×2 to a square 8×8 layout or a rectangular 5×6 or 4×3 layout. When different press cycle layouts are used, the dough pressing apparatus 100a includes a number of longitudinal axes based on the number of longitudinal columns associated with the press cycle layout. For example, when using a 5×6 layout with 5 longitudinal columns, the dough pressing apparatus 100a includes five longitudinal axes A1-3.

After the pressed dough balls 108 are formed at the pressing station 106, the conveyor 102 moves the pressed dough balls 108 to a discharge station 122. In some implementations, the discharge station 122 includes a heater to parbake the pressed dough balls 108. For example, parbaking the pressed dough balls 108 at the discharge station allow the temperature of the lower pressing platen 120 to be reduced. In some implementations, forming the pressed dough balls 108 with a reduced temperature of the lower pressing platen 120 creates rounder pressed dough balls 108.

Figure 1B:
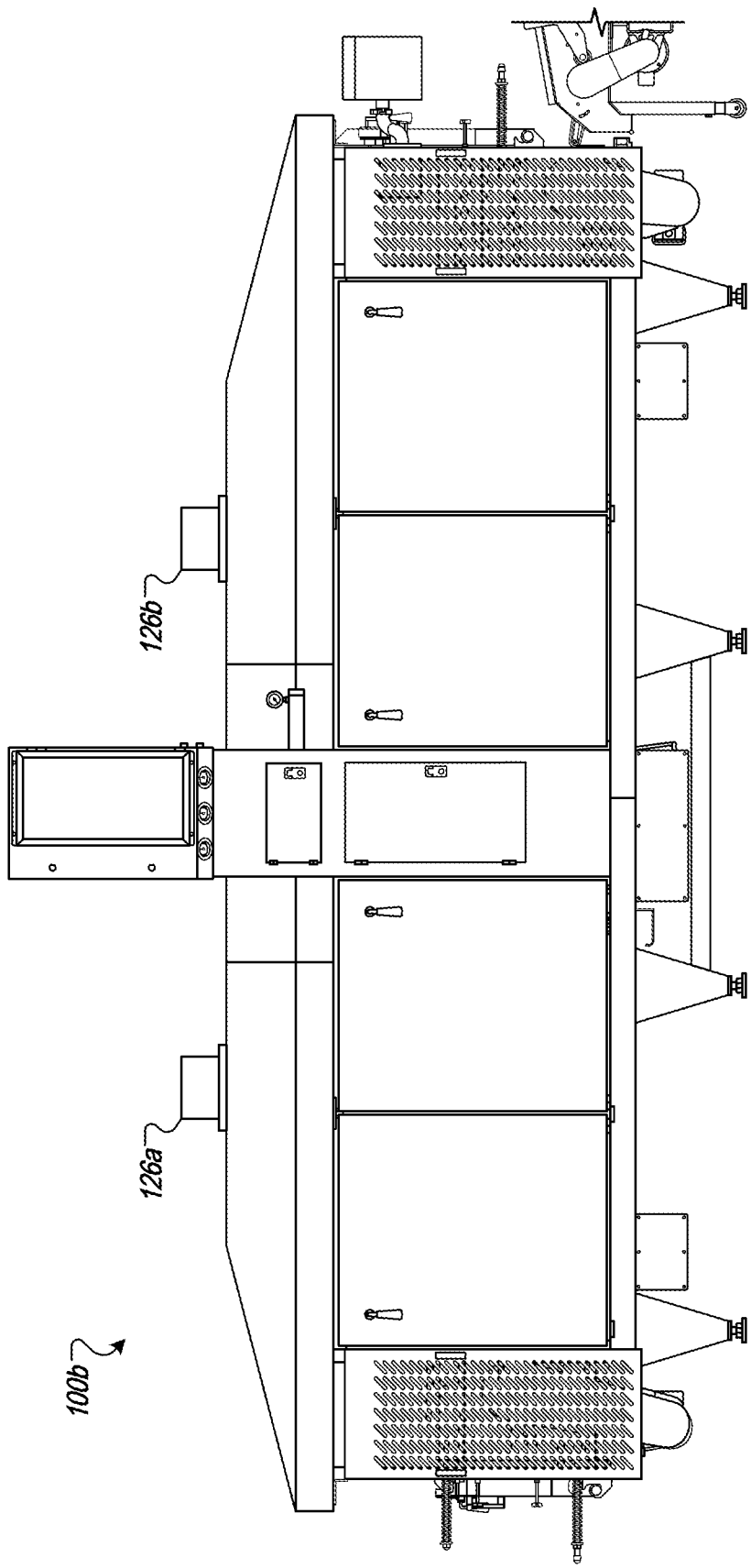

The pressed dough balls 108 are transferred from the discharge station 122 to an oven 100b, shown in FIG. 1B. For example, a conveyor 124 transfers the pressed dough balls to the oven 100b from the discharge station 122.

The oven 100b includes an oven conveyor (not shown) that transfers the pressed dough balls 108 through the oven 100b during the cooking process. As the pressed dough balls 108 are conveyed through the oven 100b, the pressed dough balls 108 are cooked so that when the pressed dough balls 108 exit the oven 100b, the cooking process is complete. Alternatively, when the pressed dough balls 108 are removed from the oven 100b by the oven conveyor, the pressed dough balls 108 proceed to another cooking process (e.g., located in another oven).

The oven 100b includes one or more gas heaters (not shown) to cook the pressed dough balls 108. The gas heaters increase heat control (e.g., heat uniformity) of the cooking process of the pressed dough balls 108. In certain implementations, when the oven 100b includes gas heaters, the gas heaters allow the oven 100b to adjust temperature more quickly. For example, when the production line is initially started the oven 100b heats up to a processing temperature more quickly using gas heaters. Alternatively, the oven 100b can use electric heaters to cook the pressed dough balls 108.

In various implementations, the oven 100b is a convection oven. A convection oven, for example, provides greater temperature uniformity during the cooking process. For example, the pressed dough balls 108 are cooked more evenly with an electric convection oven. Alternatively, the oven 100b is a gas convection oven.

In certain implementations, the oven 100b uses infrared heat to cook the pressed dough balls 108. In these implementations, using infrared heat can provide a better distribution of heat in the oven 100b and cook the pressed dough balls 108 more evenly throughout the pressed dough ball. For example, the oven 100b can require fewer heating elements when using infrared heat. In one example, the middle of a pressed dough ball is cooked approximately the same amount as the edge of the pressed dough ball when using infrared heat.

In some implementations, the oven 100b includes a stack of conveyors with each adjacent conveyor running in opposite directions across the oven. As each of the pressed dough balls 108 reaches the end of one of the conveyors, the pressed dough balls 108 pass through a safety release turnaround that flips the pressed dough balls 108 over and places the pressed dough balls 108 on the next conveyor down in the stack of conveyors. This allows both sides of the pressed dough balls 108 to be cooked as evenly as possible in the oven 100b.

In one example, when the oven 100b includes a stack of conveyors and uses infrared heat to cook the pressed dough balls, the number of heating elements needed in the oven 100b is reduced because the infrared heat is evenly distributed throughout the oven 100b. In various implementations, using infrared heat reduces the amount of time necessary to cook the pressed dough balls 108.

In certain implementations, the oven conveyor in the oven 100b is heated. Heating the oven conveyor, for example, can reduce the amount of time needed to cook the pressed dough balls 108 because the pressed dough balls 108 are cooked on both sides at the same time.

The oven 100b includes one or more vents 126a-b that exhaust gases and/or heat from the oven 100b and prevent the gases and/or heat from entering the factory housing the production line. For example, the vents 126a-b draw gases from oven 100b to prevent the gases from building up. The vents 126a-b bring fresh air into the oven 100b and/or the factory housing the production line to prevent a back draft of air caused by the exhaust of the gases and/or heat from the oven 100b. Additionally, the vents 126a-b can remove heat from the oven 100b as necessary during the cooking process.

Figure 1C:
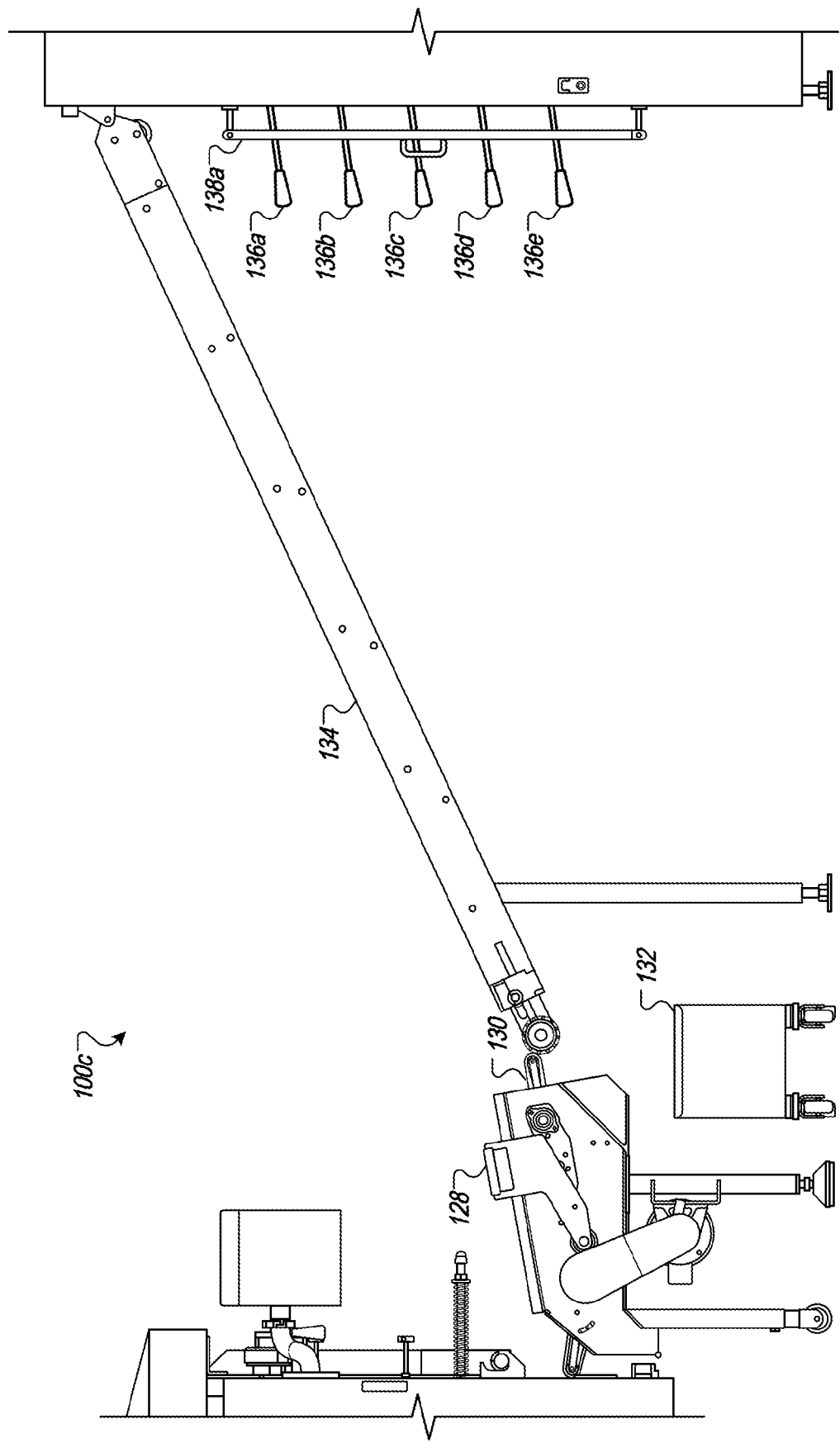

After cooking, the oven conveyor releases the pressed dough balls 108 onto a transfer system 100c, shown in FIG. 1C. The transfer system 100c moves the pressed dough balls 108 from the oven 100b to a cooler 100d, discussed in more detail below with reference to FIG. 1D.

The cooler 100d includes one or more safety release turnarounds 136a-e that transfer pressed dough balls between adjacent cooling conveyors. An end door 138a, included in the cooler 100d, provides maintenance access to the interior of the cooler 100d. For example, the end door 138a allows an operator to work on one of the safety release turnarounds 136*a-e* or a cooling conveyor located in the cooler 100*d*.

The transfer system 100*c* includes an oven removal conveyor 128. In some implementations, the oven removal conveyor 128 transfers the pressed dough balls 108 to a banded oven discharge 130. Alternatively, the oven removal conveyor 128 transfers the pressed dough balls 108 to a cooling rack input conveyor 134.

The banded oven discharge 130 includes multiple support members that allow incorrectly formed dough balls to fall between adjacent bands and into a rejected product cart 132 for removal from the production line while the pressed dough balls 108 pass across the banded oven discharge 130. In some implementations, the banded oven discharge 130 removes the incorrectly formed dough balls from the production line before the incorrectly formed dough balls can become stuck in a safety release turnaround and cause a jam in the cooler 100*d*.

Once the rejected product cart 132 is full, the rejected product cart 132 is removed from the production line and another cart is placed below the banded oven discharge 130. Alternatively, a conveyor located beneath the banded oven discharge 130 removes incorrectly formed dough balls from the production line area. For example, the conveyor transfers the incorrectly formed dough balls to another area in the factory housing the production line.

The banded oven discharge 130 transfers the pressed dough balls 108 from the oven removal conveyor 128 to the cooling rack input conveyor 134. The cooling rack input conveyor 134 transfers the pressed dough balls 108 into the cooler 100*d*, shown in FIG. 1D.

The cooler 100*d* includes multiple cooling conveyors (not shown) that transport the pressed dough balls 108 through the cooler 100*d*. As the pressed dough balls 108 move through the cooler 100*d*, air moving across the surfaces of the pressed dough balls 108 cools the pressed dough balls 108 to a reduced temperature.

For example, the pressed dough balls 108 have a temperature close to 200° F. when entering the cooler 100*d*. One or more fans move air from the environment outside of the cooler 100*d* (e.g., at an ambient temperature between about 65 to about 80° F., preferably between about 70 to about 75° F., more preferably about 72° F.) across the cooling conveyors and the pressed dough balls. As the air passes across the pressed dough balls 108, heat is removed from the pressed dough balls 108 and the pressed dough balls 108 are cooled. When the pressed dough balls 108 exit the cooler 100*d*, the pressed dough balls 108 are at a temperature close to the ambient temperature of the environment outside of the cooler 100*d*. In certain implementations, the pressed dough balls 108 are packaged for shipment after being removed from the cooler 100*d*.

In some implementations, when the cooling conveyors are manufactured from a conductive material, the cooling conveyors reduce the temperature of the pressed dough balls 108. For example, heat from the pressed dough balls 108 dissipates into the cooling conveyors as the pressed dough balls 108 are transferred through the cooler 100*d*. As air from the ambient environment blows across the cooling conveyors, some of the heat is removed from the cooling conveyors, reducing the temperature of the cooling conveyors and another cycle of the cooling process begins.

In certain implementations, the cooling conveyors are cooled directly by the cooler 100*d*. For example, the cooler 100*d* includes a freezer that cools the cooling conveyors and provides indirect cooling to the pressed dough balls 108. In one example, the cooling conveyors are directly cooled by a refrigerant and the contact between the pressed dough balls 108 and the cooling conveyors as the pressed dough balls 108 move through the cooler 100*d* reduces the temperature of the pressed dough balls 108.

The multiple cooling conveyors in the cooler 100*d* are stacked above each other in the vertical direction (e.g., forming a multi-tier conveyor) and each of the conveyors transfers the pressed dough balls 108 in a different direction from the other conveyors adjacent to the conveyor.

The cooler 100*d* includes at least three conveyors in a multi-tier conveyor stack. In some implementations, the cooler 100*d* includes between seven and nineteen cooling conveyors. In other implementations, the cooler 100*d* includes between nine and twenty-one cooling conveyors, preferably between thirteen and seventeen cooling conveyors.

The number of cooling conveyors included in the cooler 100*d* can be determined based on the baking temperature of the pressed dough balls 108. For example, when the pressed dough balls 108 are baked at a higher temperature, the cooler 100*d* includes more cooling conveyors than when the pressed dough balls 108 are baked at a lower temperature. The number of cooling conveyors in the cooler 100*d* can be determined based on the maximum or highest allowable temperature of the oven 100*b*.

For example, the number and/or length of the cooling conveyors determines the length of time that the pressed dough balls 108 are in the cooler 100*d* and the maximum change in temperature of the pressed dough balls 108. Additionally, the specific cooling methods used to reduce the temperature of the pressed dough balls 108 affect the number and/or length of the cooling conveyors.

In some implementations, the alignment of the pressed dough balls 108 as the pressed dough balls 108 move between adjacent conveyors is used to determine the number of cooling conveyors in the cooler 100*d*. For example, systems with more cooling conveyors may sometimes cause a pattern of pressed dough balls to become misaligned so that the pattern no longer includes rows of pressed dough balls that are in a uniform line (e.g., along a latitudinal axis perpendicular to the longitudinal axes A1-3) compared to a system with fewer cooling conveyors.

In one example, the cooler 100*d* includes thirteen cooling conveyors for cooling the pressed dough balls 108 to reduced or ambient temperature. A first conveyor in the cooler 100*d* transfers the pressed dough balls 108 from the left of the cooler 100*d* to the right of the cooler 100*d*, and a second conveyor directly below the first conveyer transfers the pressed dough balls 108 from the right of the cooler 100*d* to the left of the cooler 100*d*.

Figure 1D:
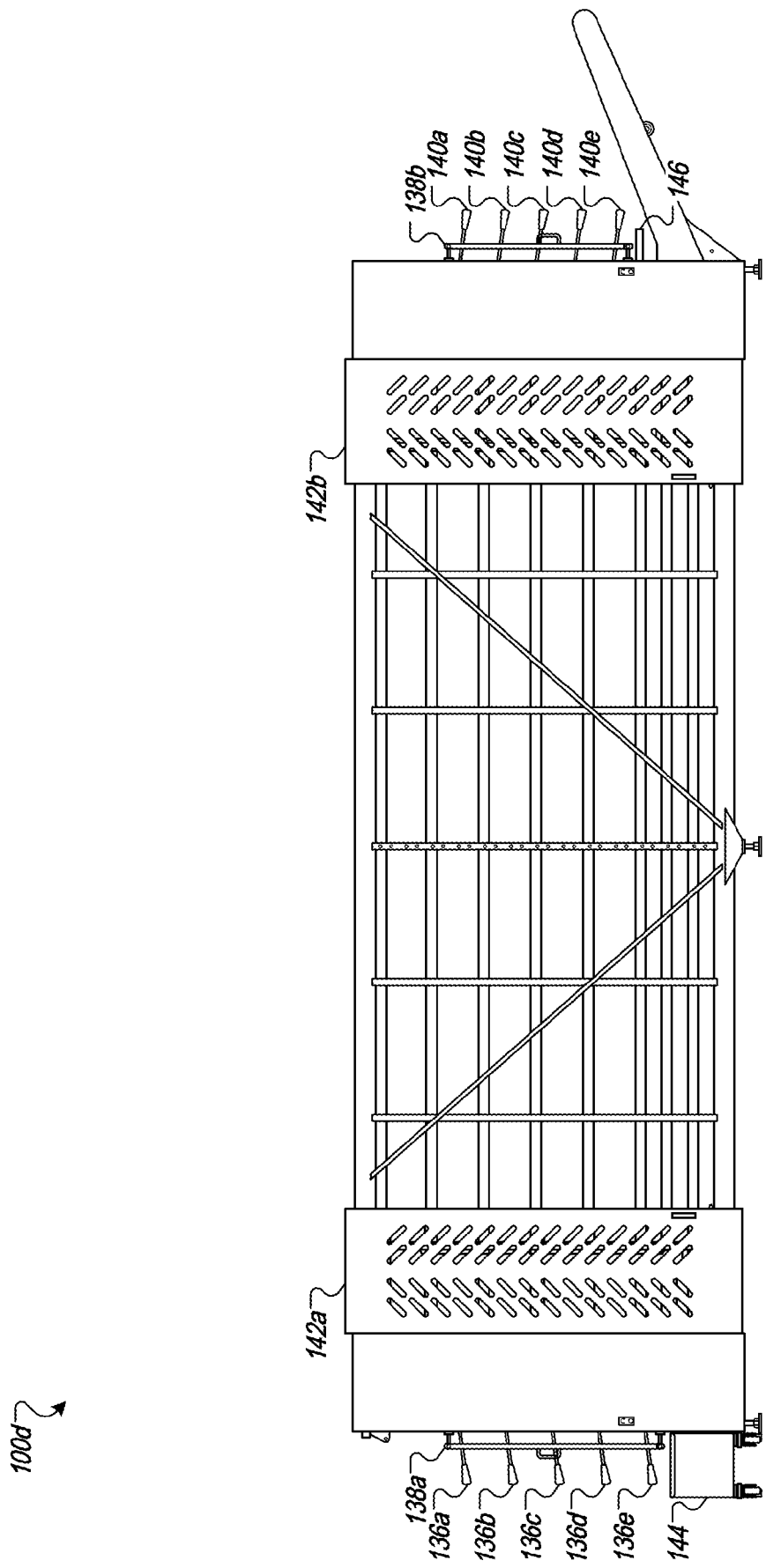

The cooler 100*d* includes the safety release turnarounds 136*a-e* on the left hand side of the cooler 100*d* and one or more safety release turnarounds 140*a-e* on the right hand side of the cooler 100*d*, shown in FIG. 1D. The safety release turnarounds 136*a-e* and 140*a-e* transfer the pressed dough balls 108 between the adjacent cooling conveyors in the cooler 100*d*.

Continuing the example, the safety release turnaround 140*a* transfers the pressed dough balls from the first conveyor, moving from left to right, to the second conveyor, moving from right to left, and flips the pressed dough balls 108 over to increase the uniformity of cooling of the pressed dough balls 108.

The cooler 100*d* includes two end doors 138*a-b* which protect the interior of the cooler 100*d* from damage and provide safety to an operator of the production line. The end doors 138*a-b* are attached to the cooler 100*d* with bolts that are removed to allow maintenance to the cooler 100d (e.g., when the cooler 100d is shutdown). In some implementations, the end doors 138a-b are attached to the cooler 100d with interlocks and that allow access to the interior of the cooler 100d (e.g., during a maintenance cycle). In certain implementations, the end doors 138a-b are connected to the cooler 100d with hinges that allow the end doors 138a-b to be opened when maintenance is performed on the cooler 100d.

The end doors 138a-b are manufactured from stainless steel and include a plurality of bars that prevent an operator from directly accessing the interior of the cooler 100d. For example, the bars form a grate that allows the safety release turnarounds 136a-e and 140a-e to extend through the end doors 138a-b from the interior of the cooler 100d.

Alternatively, the end doors 138a-b include a plate that protects the interior of the cooler 100d. The plate includes a plurality of grooves that allow an operating arm for each of the safety release turnarounds 136a-e and 140a-e to extend through the respective end door 138a-b and move along a vertical axis. For example, the operating arm of the safety release turnaround 136a extends through a groove in the end door 138a. When the safety release turnaround 136a is rotated, the handle of the safety release turnaround 136a moves along the path defined by the groove in the end door 138a.

Each of the safety release turnarounds 136a-e and 140a-e move while the end doors 138a-b remain in place with respect to the cooler 100d. For example, the safety release turnaround 140a is rotated and retracted without removal or opening of the end door 138b.

In various implementations, the cooler 100d includes one or more sensors (e.g., cameras or optical sensors) that provide inputs to a controller that stops the cooling conveyors upon detection of the opening or removal of one of the end doors 138a-b. For example, when a sensor detects that the lock connecting the end door 138a to the cooler 100d is open, the cooling conveyors are stopped by a controller that receives input from the sensor. The controller can be physically attached to the sensor, or can be separate from the sensor. In some implementations, stopping the cooling conveyors when one of the end doors 138a-b is opened reduces the chance of damage to the cooling conveyors.

The cooler 100d includes two side doors 142a-b that open to allow maintenance access to the interior of the cooler 100d. In certain implementations, the side doors 142a-b are connected with a cable (not shown) manufactured from steel. When a sensor (e.g., a mechanical, a camera and/or optical sensor) in the cooler 100d detects a change in the tension of the cable or movement of the cable, the cooler 100d is shut down (e.g., the cooling conveyors are stopped) by a controller that receives input from the sensor. The controller can be physically located within the sensor, or can be separate from the sensor. In some implementations, the entire production line is shutdown when the sensor detects a change in the tension of the cable or movement of the cable.

In one example, when at least one sensor (e.g., a mechanical sensor) detects mechanical disturbance of the cable placed along the perimeter of the cooler 100d and connecting the side doors 142a-b, the cooling conveyors are stopped by a controller that receives input from to the sensor. In another example, when the side door 142a is opened, the tension in the cable decreases and a sensor (e.g., an optical sensor) detects the decrease in the tension. A controller receives input from the sensor indicating the decreased tension and the cooler 100d is stopped.

The production line includes a 144 positioned along the left end of the cooler 100d. When pressed dough balls are removed from the cooler 100d, the removed dough balls fall into the removed product cart 144 and are transported away from the production line.

For example, one or more of the safety release turnarounds 136a-e are opened to remove a jammed pressed dough ball from the cooler. The jammed pressed dough ball falls into the removed product cart 144 and is taken away from the production line when the removed product cart 144 is full or nearly full. Alternatively, one or more of the safety release turnarounds 136a-e are opened before a pressed dough ball that may cause a jam arrives at the respective safety release turnaround and the pressed dough ball falls into the removed product cart 144.

A removed product conveyor 146 positioned at the right end of the cooler 100d receives pressed dough balls from the cooler 100d when one or more of the safety release turnarounds 140a-e are opened. For example, the safety release turnaround 140c is opened to remove one or more jammed pressed dough balls from the cooler 100d, the jammed pressed dough balls fall onto the removed product conveyor 146, and the safety release turnaround 140c returns to a processing position to allow pressed dough balls to continue to pass through the cooler 100d.

In some implementations, the production line includes a second removed product conveyor instead of the removed product cart 144. For example, the second removed product conveyor and the removed product conveyor 146 transfer pressed dough balls that caused or may have caused a jam in the cooler 100d away from the production line.

FIGS. 2A-C illustrate an example of a cooler 200 in different operating positions 202a-c. The cooler 200 cycles through the different operating positions 202a-c when there is a jam or the potential of a jam in the cooler 200 during processing of pressed dough balls in order to remove the jam from the cooler 200. For example, the cooler 200 is the same as the cooler 100d and cools the pressed dough balls 108 after the oven 100b bakes the pressed dough balls 108.

The cooler 200 includes a plurality of safety release turnarounds 204a-b positioned on either end of the cooler 200. For example, the safety release turnarounds 204a-b are the safety release turnarounds 136a-e or the safety release turnarounds 140a-e.

Each of the safety release turnarounds 204a-b transfers a pressed dough ball from a first cooling conveyor to a second cooling conveyor. For example, the safety release turnaround 204a transfers pressed dough balls from a first cooling conveyor 206a to a second cooling conveyor 206b, and the safety release turnaround 204b transfers pressed dough balls from a third cooling conveyor 206c to a fourth cooling conveyor 206d.

Each of the safety release turnarounds 204a-b includes a semicircular surface 208a-b, respectively, which provides a guiding surface for transferring the pressed dough balls 108 between adjacent cooling conveyors. For example, the semicircular surface 208a transfers the pressed dough balls 108 from the first cooling conveyor 206a to the second cooling conveyor 206b through a first turnaround area 210a located between the semicircular surface 208a and the first cooling conveyor 206a. Similarly, the pressed dough balls 108 move through a second turnaround area 210b when transferred by the semicircular turnaround 208b.

Each of the safety release turnarounds 204a-b includes an operating arm 212a-b. The operating arms 212a-b extend through an end door 214 and allow an operator to reposition the safety release turnarounds 204a-b when there is a jam in the cooler 200. For example, an operator moves the operating arm 212a to rotate and retract the safety release turnaround 204a and remove a jam from the first turnaround area 210a.

The safety release turnaround 204a rotates around a latitudinal axis, centered at a pivot joint 216 affixed to the semicircular surface 208a, when the operating arm 212a is raised or lowered. The pivot joint 216 allows the safety release turnaround 204a to rotate an angle A, shown in FIG. 2B, around the latitudinal axis into the operating position 202b and increases the size of the first turnaround area 210a.

In some implementations, increasing the size of the first turnaround area 210a decreases the possibility of the safety release turnaround 204a contacting other parts of the cooler 200 when moving. In certain implementations, increasing the size of the first turnaround area 210a reduces the efficiency of the safety release turnaround. For example, when the first turnaround area 210a is larger, the pressed dough balls 108 are more likely to become stuck or malformed as the pressed dough balls 108 move through the cooler 200.

The pivot joint 216 is retractably mounted to a slide mount 218 which allows the safety release turnaround 204a to move along the slide mount 218 in a drawer open and close motion, as shown in FIG. 2C, to operating position 202c. The slide mount 218 allows the safety release turnaround 204a to retract a distance D from the first cooling conveyor 206a which allows one or more jammed pressed dough balls to fall through the first turnaround area 210a and out of the cooler 200. Once the jammed pressed dough balls are removed from the cooler 200, the jammed pressed dough balls are taken away from the production line, as discussed in more detail above.

For example, when a pressed dough ball is jammed in the first turnaround area 210a, the safety release turnaround 204a is repositioned from the operating position 202a to the operating position 202c, temporarily transitioning through the operating position 202b, in order to remove the jammed pressed dough ball. In a raised and retracted position (e.g., the operating position 202c), the size of the first turnaround area 210a is larger than the size of the first turnaround area 210a in a processing position (e.g., the operating position 202a), and the jammed pressed dough ball is discharged from the cooler 200. As an example, discharged dough balls can be transferred away from cooler 200 by a removed product conveyor (not shown).

In one example, a sensor detects that a pressed dough ball is jammed in the first turnaround area 210a and that the safety release turnaround 204a needs to be opened to remove the jam. The sensor provides a message to a controller indicating that the safety release turnaround 204a is jammed. The controller can be physically located within the sensor, or can be separate from the sensor. The controller presents a warning on a monitor notifying an operator of the production line of the jam so that the operator can rotate the operating arm 212a into the operating position 202b and retract the operating arm 212a into the operating position 202c. When the safety release turnaround 204a is in the operating position 202c, the jammed pressed dough ball falls out of the cooler 200 and is removed from the production line.

Alternatively, the operator determines when there is a jam in the cooler 200 and opens one or more of the safety release turnarounds 204a-b to remove the jam from the cooler 200.

In certain implementations, the operator manually maintains the operating arm 212a in the operating position 202c for a predetermined duration of time to allow jammed pressed dough balls to fall out.

In another implementation, the operator may insert the operating arm 212a into a latch mechanism that retains the operating arm 212a in the operating position 202c. The operator then unlatches and returns the operating arm 212a to the operating position 202a after the jammed pressed dough ball falls out of the cooler.

In another example implementation, the pivot joint 216 may be comprised of two concentric rings with a friction contact interface. Without an operator applying a force to the operating arm 212a that overcomes static friction, the operating arm 212a remains in an operating position, such as the operating position 212c for releasing jammed pressed dough balls.

In other implementations, a motor coupled to the pivot joint 216 applies a force that maintains the operating arm 212a in the operating position 202c. The resting position for the operating arm 212a can vary based on the design of the motor coupling to the pivot joint 216. For example, the resting position of the motor can be the operating position 202a, requiring the motor to be active to reposition the operating arm 212a to the operating position 202c. Alternatively, the resting position for the operating arm 212a and the motor can be the operating position 202c, requiring the motor to be active to reposition the operating arm 212a to the operating position 202a.

In some implementations, the movement of the safety release turnarounds 204a-b is automated. For example, a controller receives a message indicating that one or more of the safety release turnarounds 204a-b are jammed, and the controller instructs one or more actuators, associated with the safety release turnarounds 204a-b, to automatically rotate and slide the associated safety release turnarounds from the operating position 202a to the operating position 202c to remove a jam from the cooler 200.

In certain implementations, the actuator that rotates the safety release turnaround 204a along the pivot joint 216 includes a motor that receives inputs from a controller. The motor can be a stepper motor with a feedback sensor to reposition the operating arm 212a between the operating position 202a and 202b. Alternatively, the motor can be a servomotor without a feedback sensor.

In one implementation, the pivot joint 216, which semicircular surface 208a attaches to, can be the output rotary shaft of the motor. In another implementation, the pivot joint 216 is mechanically coupled to the output rotary shaft of the motor through a gear assembly. In various implementations, the pivot joint 216 is mechanically coupled to the output rotary shaft of the motor through a belt assembly.

In some implementations, the actuator for automatically sliding the safety release turnaround 204a along the slide mount 218 between the operating positions 202b and 202c involves a linear actuator that receives inputs from a controller. For example, the linear actuator can be an electro-mechanical actuator that converts the rotary output of a motor to a linear motion, such as a camshaft. In another example, the linear actuator can be a hydraulic actuator, such as an air filled piston assembly. In a further example, the linear actuator can be a pneumatic actuator, such as a liquid filled piston assembly.

In certain implementations, at least one optical sensor (not shown) monitors each of the safety release turnarounds 204a-b and determines when there is a jam in one of the turnaround areas 210a-b. For example, an optical sensor in the form of a photoeye can be positioned adjacent one or more pivot joints (such as pivot joint 216) to detect the passage of pressed dough balls. In one embodiment, an associated controller receives input from the photoeyes and utilizes timing parameters to determine whether the dough balls are proceeding correctly through the conveyor system or rather whether a turnaround 204b is likely jammed. For example, the controller may determine whether the photoeye is interrupted with a frequency indicative of pressed dough balls moving correctly through the conveyors. In this embodiment, an acceptable time window may be selected for the delay between photoeye interruptions. Excessively long delays may be caused by an upstream jam and thus the controller, upon detecting a delay in excess of a maximum delay threshold, may send an alert to a user terminal and generate a fault that causes the conveyors to stop such that a user can remove the jam as set forth herein. A fault and alert may also be generated upon the detection of a delay that is below a minimum threshold, which likewise may indicate that a jam has caused the spacing between two adjacent pressed dough balls to change.

The controller may optionally be configured to recognized an interruption of the photoeye as a pressed dough ball only if the interruption lasts at least a predetermined period of time. Shorter interruptions may be ignored or assigned to other conditions, such as fault conditions.

In other configurations, sensors may be disposed in the turnaround areas 210a-d such that a jammed pressed dough ball (such as dough ball 420) may be detected. In this example, the controller may be configured to generate a fault and/or alert in the event a photoeye sensor is interrupted for more than a predetermined period of time, which would be indicative of a jam. In some implementations a maximum photoeye interruption duration, for example thirty seconds or sixty seconds, is used as a threshold beyond which the controller indicates that the safety release turnaround 204b is jammed and causes the safety release turnaround to be actuate and the cooler 200 to be shut down.

In certain implementations, a controller does not send a message indicating that pressed dough ball is jammed until a predetermined period of time has passed. For example, the controller allows a pressed dough ball to remain in the same place on a conveyor or in a safety release turnaround until the pressed dough ball has remained in the same place for the predetermined period of time. Once the predetermined period of time has passed the controller indicates that a safety release turnaround should be opened to allow the pressed dough ball that is jammed in the cooler 200 to be removed from the cooler 200, as by generation of the aforementioned alert and fault messages.

In some implementations, the photo eye can comprise a photo emitter and photo detector on opposite lateral sides of the safety release turnaround 204b. In another implementation, the photo eye can comprise a photo emitter and photo detector on the same side, and a photo reflector on the opposite end of a safety release turnaround 204b.

In some implementations, at least one sensor identifies a potential jam before the potential jam occurs in one of the turnaround areas 210a-b. For example, the sensor (e.g., a camera) is positioned above the first cooling conveyor 206a and the sensor provides information associated with pressed dough balls moving along the first cooling conveyor 206a to a controller. The controller analyzes the received information to determine if one or more of the pressed dough balls may cause a jam in the first turnaround area 210a. The controller can be physically located within the sensor, or can be separate from the sensor.

For example, if two pressed dough balls are stuck together the photoeye interruption may exceed predetermined duration and upon detection of that condition the controller signals that the safety release turnaround 204a should be repositioned to operating position 202c. The controller automatically instructs an actuator to reposition the safety release turnaround 204a to the operating position 202c, without user input, to allow the two pressed dough balls that are stuck together to fall from the cooler and prevent a potential jam from occurring.

Alternatively, the controller presents a message to an operator, and the operator manually repositions the safety release turnaround 204a to the operating position 202c to prevent a jam from occurring.

In some implementations, one or more sensors positioned outside of the cooler 200 identify potential jams before a jam occurs. For example, a sensor positioned along a conveyor (e.g., the cooling rack input conveyor 134) provides a signal to a controller that analyzes the signal. In one example, when the sensor is a camera, the signal includes a sequence of images of the conveyor. The controller analyzes the signal to identify pressed dough balls that may cause a jam in the cooler 200 so that the pressed dough balls can be removed from the cooler 200 before a jam occurs. For example, a first safety release turnaround (e.g., the safety release turnaround 140a) is opened prior to the arrival of the pressed dough ball, which may cause a jam (e.g., because the pressed dough ball has an atypical shape), at the first safety release turnaround. When the pressed dough ball arrives at the first safety release turnaround, the pressed dough ball is discharged from the cooler 200 and the first safety release turnaround is returned to the operating position 202a.

In certain implementations, the safety release turnarounds 204a-b can be repositioned through the operating positions 202a-c while the cooling conveyors 206a-d are moving. For example, a pressed dough ball jammed in the second turnaround area 210b can be discharged from cooler 200 without stopping the cooler 200 or other parts of the production line, reducing the downtime of the production line.

In various implementations, two or more safety release turnarounds (e.g., the safety release turnarounds 204a-b, 136a-e, or 140a-e) can be repositioned at substantially the same time. For example, if the controller analyzing the signal from one or more sensors determines that a pressed dough ball has not been detected leaving the cooler 200 for more than a predetermined period of time, the controller can instruct one or more actuators to position all of the safety release turnarounds in the operating position 202c to remove a jam from the cooler 200 (e.g., without determining which specific safety release turnaround(s) are jammed).

In another example, if the controller knows that the jam occurred in a specific portion of the cooler 200, only the safety release turnarounds associated with that portion are positioned in the operating position 202c by an actuator based on input from the controller. For example, if the controller determines that the jam occurred in the bottom half of the cooler (e.g., based on feedback from two or more sensors), the safety release turnarounds 136c-e and the safety release turnarounds 140d-e are moved by an actuator to the operating position 202c either automatically by the controller (e.g., without user input) or manually. Alternatively, if the controller determines that the jam occurred on the right end of the cooler (e.g., based on input from a sensor), the safety release turnarounds 140a-e are opened by one or more actuators while the safety release turnarounds 136a-e remain closed.

In various implementations, a safety release turnaround remains in the operating position 202c for a predetermined period of time to allow a jam or potential jam to exit the cooler 200. For example, the predetermined period of time is between about 30 to about 90 seconds, preferably between about 45 to about 60 seconds. The predetermined period of time is longer for the removal of potential jams than the removal of an actual jam. During the predetermined period of time, a pressed dough ball previously jammed in one of the turnaround areas 210a-b is discharged from the cooler 200.

The duration of the predetermined period of time can be determined based on the coefficient of static friction and/or the coefficient of kinetic friction between the semicircular surfaces 208a-b and the pressed dough balls. For example, the predetermined period of time has a longer duration for high coefficients of friction. In some implementations, the predetermined period of time is determined based on the recipe used by the production line. For example, the predetermined period of time is longer when associated with a recipe for pressed dough balls with high surface adhesiveness.

The length of each of the operating arms 212a-b is between about 4 and about 40 inches, preferably between about 4 to 14 inches and in selected embodiments between about 3 to 6 inches or 10 to 14 inches. The length of operating arms 212a-b exceeds the separation distance between end door 214 and semicircular surfaces 208a-b. For example, the operating arms 212a-b are long enough such that the safety release turnarounds 204a-b are repositioned without removing or opening the end door 214.

The radius of curvature of each of the semicircular surfaces 208a-b is between about 1 to about 6 inches and in certain embodiments about 2 to about 3 inches, preferably between about 2.25 to about 2.75 inches. The radius of curvature of each of the semicircular surfaces 208a-b can be determined based on thickness of cooling conveyors 206a and 206c.

The arc length each of the semicircular surfaces 208a-b is between about 5 to about 11 inches, or about 6 to about 9.5 inches, and preferably between about 7 to about 8.5 inches. The arc length of each of the semicircular surfaces 208a-b can be determined based on the separation height between cooling conveyors 206a-d.

The composition of semicircular surfaces 208a-b can be selected based on the food grade rating of the material. In one example, both of the semicircular surfaces 208a-b are manufactured from stainless steel based on the approval and/or certification of stainless steel for food processing. Stainless steel is used to increase hardness (e.g., durability) and corrosion resistance of the semicircular surfaces 208a-b. In another example, silicone is used to make the semicircular surfaces 208a-b based on the thermal stability, and low stick resistance of silicone.

The angle A of rotation of the safety release turnarounds 204a-b is between about 15 to about 65 degrees, preferably between about 25 to about 50 degrees, more preferably about 40 degrees. The angle A of rotation of the pivot joint 216 can be determined based on the dimensions of the cooler 200 (e.g., the distances between the cooling conveyors) and/or the dimensions of the pressed dough balls 108 being cooled. For example, when the cooling conveyors 206a-d are closer together, the angle A of rotation is smaller than if the cooling conveyors 206a-d were farther apart.

In certain implementations, the slide mount 218 allows the pivot joint 216 to slide a distance D away from the first cooling conveyor 206a. The distance D is between about 2 to about 18 inches, preferably between about 2 to about 12 inches, more preferably between about 3 to about 9 inches, and in selected embodiments about 4-6 inches. The retracting distance D of the slide mount 218 can be determined based on the dimensions of the cooler 200. For example, the distance D is based on the lengths of the cooling conveyors 206a-d, such as the distance that the second cooling conveyor 206b extends to the left of the third cooling conveyor 206c. In some implementations, the distance D is determined based on the dimensions of the pressed dough balls 108 being cooled. For example, the distance D is longer for pressed dough balls with a larger diameter than for pressed dough balls with a smaller diameter.

FIGS. 3A-C illustrate an example of a cooler 300 with a pressed dough ball 320 in different pressed dough ball positions 302a-c. The pressed dough ball 320 moves through the pressed dough ball positions 302a-c when the pressed dough ball 320 progresses through the cooler 300 without causing a jam. For the pressed dough ball positions 302a-c, the safety release turnaround 204a is in the operating positioning 202a as, described with reference to FIG. 2A above.

In the pressed dough ball position 302a, the pressed dough ball 320 is on the first cooling conveyor 206a, with a velocity vector in the direction of the safety release turnaround 204a. The pressed dough ball 320 is planar and previously passed through one or more safety release turnarounds located before the safety release turnaround 204a unimpeded.

As the pressed dough ball 320 reaches the end of the first cooling conveyor 206a, the pressed dough ball 320 passes through the first turnaround area 210a. Gravitational free fall causes the pressed dough ball 320 to fall downwards within the first turnaround area 210a, to the pressed dough ball position 302b.

In pressed dough ball position 302b, the pressed dough ball 320 is in contact with the semicircular surface 208a. In certain implementations, the pressed dough ball 320 flips over based on the combined momentum caused by the first cooling conveyor 206a, and gravitational free fall. In other implementations, the pressed dough ball 320 remains in the same orientation during depositing on the semicircular surface 208a.

The combined momentum of previously traveling on the first cooling conveyor 206a and gravitational effect cause the pressed dough ball 320 to slide along the semicircular surface 208a towards the second cooling conveyor 206b with a force exceeding the coefficient of static friction and/or the coefficient of kinetic friction between the semicircular surface 208a and the pressed dough ball 320.

In the pressed dough ball position 302c, the pressed dough ball 320 is on the second cooling conveyor 206b, with a velocity vector in the direction away from the safety release turnaround 204a. The pressed dough ball 320 is planar and has passed through the safety release turnaround 204a unimpeded. In certain implementations, the pressed dough ball 320 slides out of the first turnaround area 210a and onto the second cooling conveyor 206b due to the force of gravity. In other implementations, the pressed dough ball 320 slides partially out of the first turnaround area 210a, and the leading edge of the pressed dough ball 320 comes into contact with the second cooling conveyor 206b, causing the second cooling conveyor 206b to pull the pressed dough ball 320 out of the first turnaround area 210a.

Figure 4:
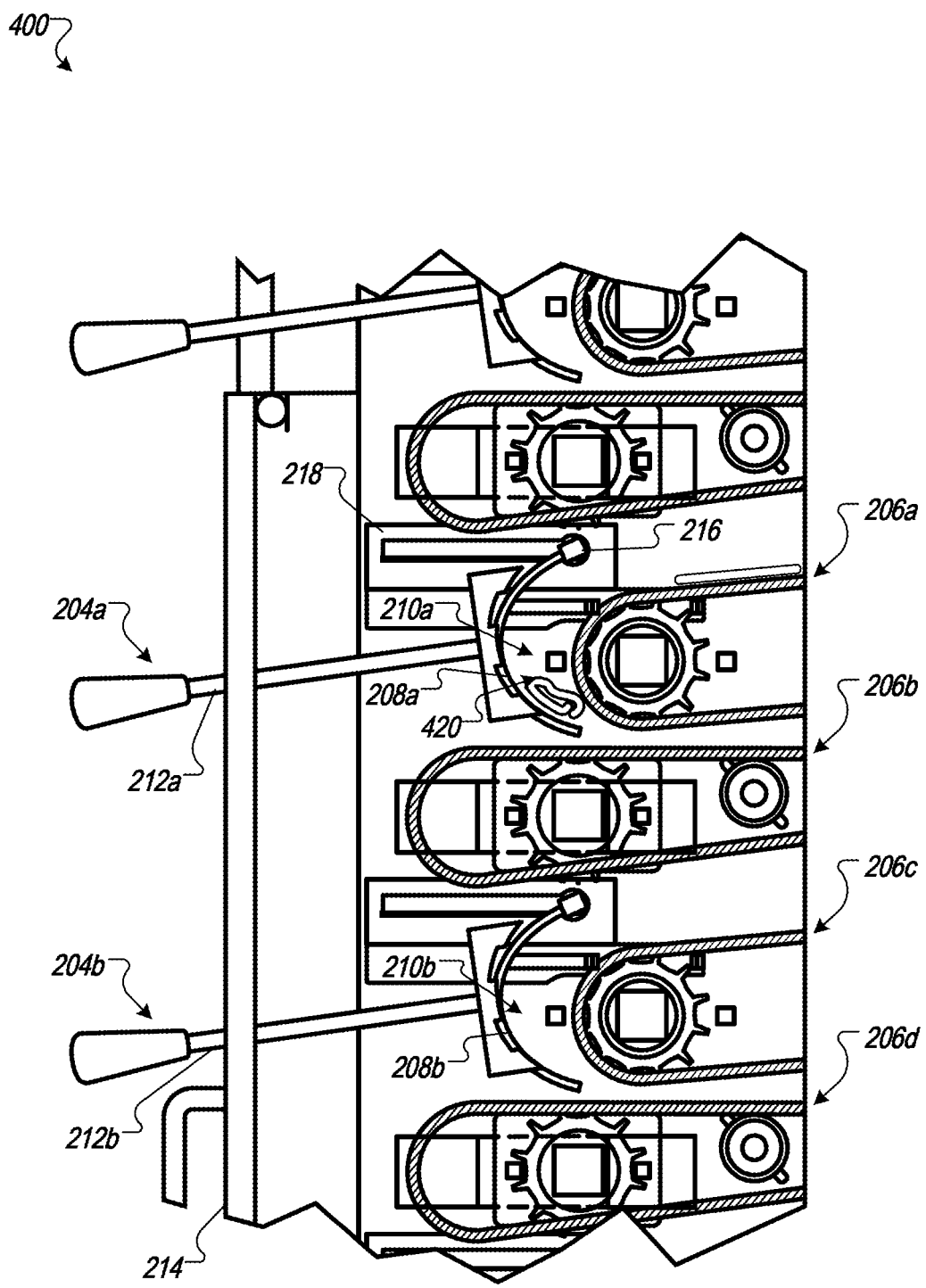
FIG. 4 illustrates an example of a pressed dough ball jammed in a system.

FIG. 4 illustrates an example of a jammed pressed dough ball 420 in a cooler 400. After being deposited by the first cooling conveyor 206a into the first turnaround area 210a of the safety release turnaround 204a, the jammed pressed dough ball 420 remains stationary on the semicircular surface 208a. In some examples, the jammed pressed dough ball 420 is planar (e.g., a flat pressed dough ball has bunched up to form the jammed pressed dough ball 420). In other examples, the jammed pressed dough ball 420 is non-planar (e.g., two dough balls are stuck together to form the jammed pressed dough ball 420).

The time that jammed pressed dough ball 420 remains stationary on semicircular surface 208a may cause additional pressed dough balls to be deposited in the first turnaround area 210a. In this situation, pressed dough balls traveling along the same longitudinal axis (e.g., one of A1-3 of FIG.

Figure 5:
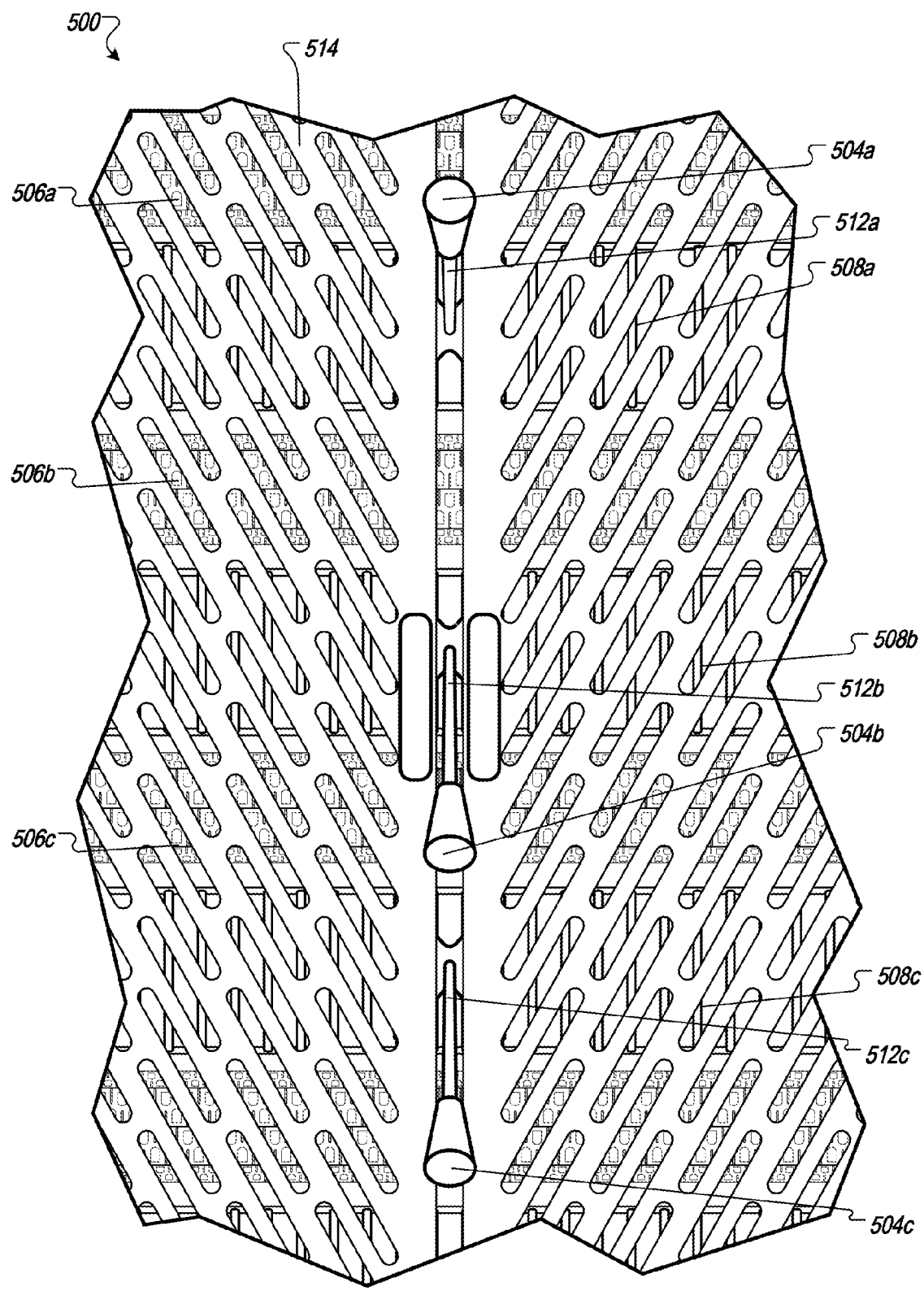
FIG. 5 illustrates an example end view of a system.

1A) as jammed pressed dough ball 420 will be impeded by the jammed pressed dough ball 420. Pressed dough balls traveling along other longitudinal axes may also be impeded due to accumulation of impeded pressed dough balls and prevented from passing through the cooler 400. FIG. 5 illustrates an example end view of a cooler 500. The cooler 500 includes a plurality of safety release turnarounds 504*a-c*, with each of the safety release turnarounds 504*a-c* having an attached semicircular surface 508*a-c*, respectively. Each of the safety release turnarounds 504*a-c* includes a centrally positioned operating arms 512*a-c*, respectively.

In certain implementations, the quantity of operating arms for a safety release turnaround may be greater than one. For example, the number of operating arms associated with a safety release turnaround is determined based on the width of the safety release turnaround. In certain implementations, the position of one or more operating arms for a safety release turnaround may vary. For example, the position of the operating arms 512*a-c* can be selected to allow an operator to easily move each of the operating arms 512*a-c* separately.

In some implementations, the operating arms 512*a-c* may be oriented in the same direction for a particular operating position (e.g., 202*a-c*). In various implementations, the operating arms 512*a-c* may be oriented differently for a particular operating position (e.g., 202*a-c*). For example, the operating arm 512*a*, located at a higher elevation than the operating arms 512*b-c*, may be aligned differently than the operating arms 512*b-c* to provide an operator an easier time manipulating the operating arm 512*a* at the higher elevation.

The cooler 500 includes a plurality of cooling conveyors 506*a-c* that transfer pressed dough balls through the cooler 500. For example, the pressed dough balls are transferred from one of the cooling conveyors 506*a-c* to a corresponding semicircular surface 508*a-c* respectively.

In some implementations, the retracting range of the safety release turnarounds 504*a-c* allows the rear side of the semicircular surfaces 508*a-c* to make contact with an end door 514 to provide a mechanical impulse force to assist in dislodging jammed pressed dough balls from the safety release turnarounds 504*a-c*. In certain implementations, the retracting range of the safety release turnarounds 504*a-c* may not allow the rear side of the semicircular surfaces 508*a-c* to make contact with the end door 514 in order to minimize mechanical surface wear on the interior of the end door 514.

In various implementations, the safety release turnarounds 504*a-c* are positioned in different operating positions. For example, the safety release turnaround 504*a* is in an open operating position, allowing one or more dough balls to fall out of the cooler 500, while the safety release turnarounds 504*b-c* are in closed operating positions.

Figure 6:
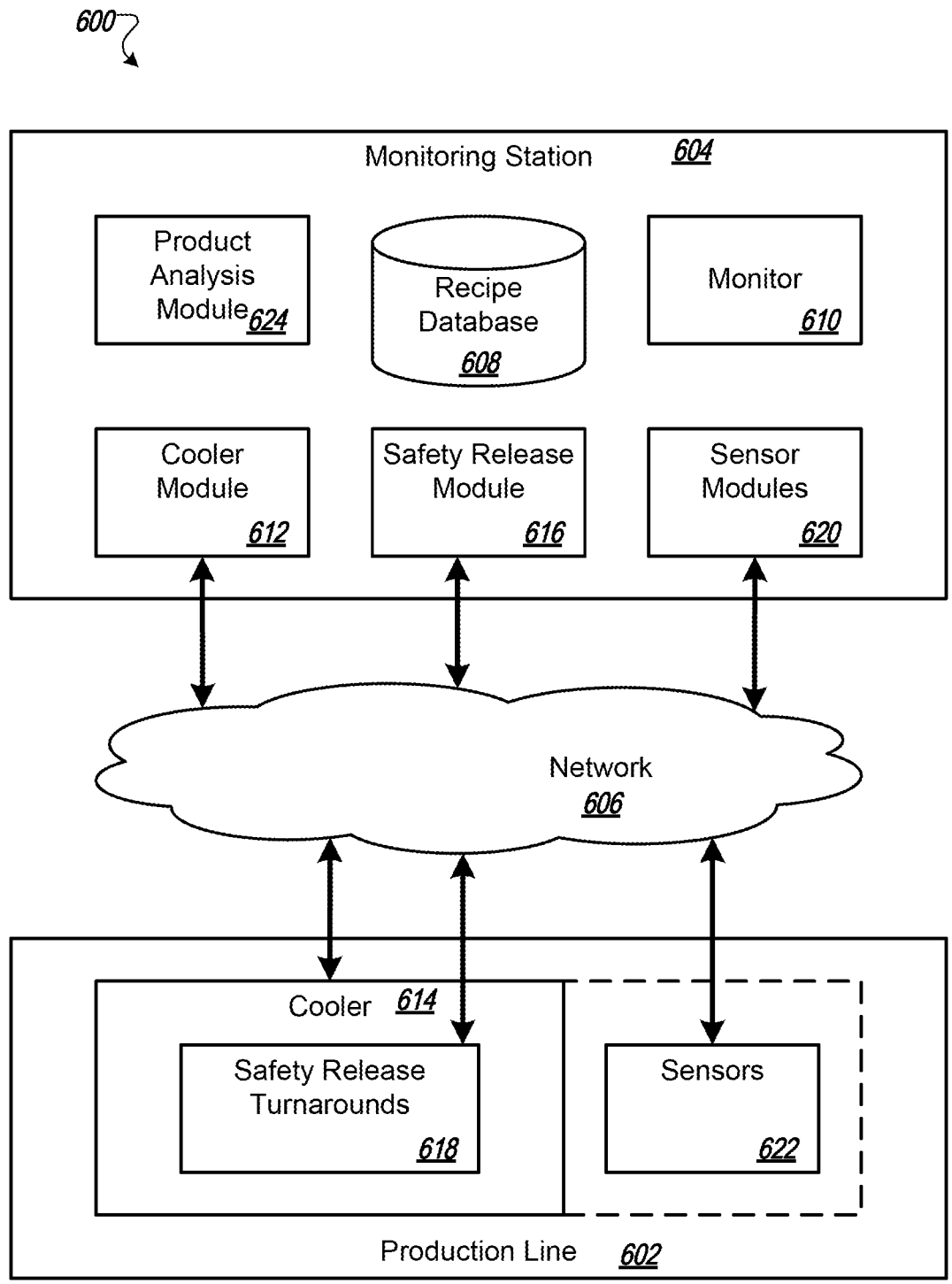
FIG. 6 illustrates an example of a system for monitoring a production line.

FIG. 6 illustrates an example of a system 600 for monitoring a production line 602. For example, a monitoring station 604 collects information on the state of the production line 602, provides processing parameters to the stations in the production line 602, and determines if the production line 602 should be stopped.

The monitoring station 604 can provide instructions to set an operational state of the production line 602. For example, the monitoring station 604 provides processing parameters to different stations in the production line 602 where the processing parameters are specific to a recipe currently in use on the production line 602.

The monitoring station 604 and the production line 602 communicate over a network 606 in the form of a local area network at a production facility. In certain implementations, the network 606 allows a remote user to monitor the production line 602. In another example, the network 606 connects separate stations in the production line 602 with the monitoring station 604 and does not allow remote access to the production line 602 or monitoring station 604.

The monitoring station 604 includes a recipe database 608 that contains recipe information accessible to a user of the monitoring station 604. For example, a monitor 610 provides an interface for a user to retrieve recipe information associated with a recipe stored in the recipe database 608. As another example, the monitor 610 presents an interface to a user that allows the user to modify a recipe retrieved from the recipe database 608 and update the retrieved recipe.

A user can input parameters for a new recipe into the recipe database 608 using an input device (e.g., a keyboard) or a touch screen monitor (e.g., the monitor 610). For example, a list of categories associated with parameters in the recipe database 608 can be displayed on the monitor 610, and the user selects values or a range of values for each category.

The monitoring station 604 presents parameters of a recipe selection from recipe database 608 to the user using the monitor 610. The user can verify the recipe parameters on the monitor 610. The monitoring station 604 configures the production line 602 to match the verified recipe parameters. Alternatively, the monitoring station 604 can configure the production line 602 without verification of recipe parameters from the user.

The monitoring station 604 includes a cooler module 612. In one example, the monitoring station 604 provides recipe parameters to the cooler module 612 for a recipe being used on the production line. The recipe parameters can be retrieved from a recipe stored in the recipe database 608. Alternatively, recipe parameters input by a user are sent to the cooler module 612.

The cooler module 612 transmits the recipe parameters over the network 606 to the production line 602. For example, the recipe parameters are used to configure a cooler 614 included in the production line 602.

In some implementations, the cooler configuration parameters sent by cooler module 612 include velocities for one or more conveyor belts located in the cooler 614. For example, the velocity of the plurality of conveyors in the cooler 614 can be configured to approximately the same velocity. Alternatively, individual conveyor belts in the cooler 614 can be programmed to different velocities.

The configuration parameters sent by cooler module 612 to the cooler 614 can include cooling fan information. For example, the on/off status of each one of the plurality of fans in cooler 614 can be controlled. The rotational speed of each one of the plurality of fans in cooler 614 can be controlled by parameters provided to the cooler 614 by the cooler module 612.

The cooler 614 can provide status information to cooler module 612. For example, the cooler 614 can provide the conveyor belt velocities and the actual temperature of the cooler 614 to the cooler module 612.

The cooler module 612 can provide data to the monitor 610 for user verification and/or monitoring. For example, the cooler module 612 can present information on the monitor 610 based on the data received from the cooler 614.

The monitoring station 604 includes a safety release module 616, which configures one or more safety release turnarounds 618 in the production line 602. For example, the safety release module 616 activates one or more of the safety release turnarounds 618 in the production line 602.

The safety release turnarounds 618 can be located in a single station on the production line 602 or in multiple different stations. In some examples, when the safety release turnarounds 618 are located in multiple different stations there is a single safety release module for each station.

The safety release module 616 provides instructions to the safety release turnarounds 618 indicating when a safety release module should open (e.g., move the operating position 202c). For example, the safety release module 616 determines that a safety release turnaround is jammed and instructs that safety release turnaround to open.

In some implementations, the instructions provided by the safety release module 616 to the safety release turnarounds 618 include a retraction distance. For example, the retraction distance of the safety release turnarounds 618 when switching between an processing position and a position to release a jam can be changed based on the thickness of the pressed dough balls (e.g., based on recipe information in the recipe database 608). Alternatively, the retraction distance is a fixed distance that the safety release turnarounds 618 move each time to release a jam or potential jam from the production line 602.

In certain implementations, the safety release module 616 provides the safety release turnarounds 618 with pivot angle information. In one example, the pivot angle of the safety release turnarounds 618 is the angle A of rotation of a single safety release turnaround when the safety release turnaround is moving between an operating position (e.g., operating position 202a) and a position to release jams in the turnaround (e.g., operating position 202c). In various implementations, the pivot angle can be adjusted based on the thickness of the pressed dough balls.

Alternatively, the pivot angle of the safety release turnarounds 618 is fixed. For example, all of the safety release turnarounds 618 rotate the same amount when moving between the operating position 202a and the operating position 202b. In another example, the pivot angle is based on the station associated with the safety release turnarounds. In this example, a safety release turnaround in a cooler has a larger angle of rotation than a safety release turnaround in an oven.

In various implementations, the safety release module 616 provides a controller that activates one or more actuators that move the safety release turnarounds 618 with timing information. As an example, timing information can include the duration of time the safety release turnarounds 618 remain in a retracted position when releasing jams in the production line 602. The duration can be adjusted based on the properties of the pressed dough balls. For example, pressed dough balls with more oil have a shorter duration than pressed dough balls with less oil.

The timing information can include a delay time. For example, one of the safety release turnarounds 618 can receive the timing information and determine that the safety release turnaround should wait for ten seconds before opening.

The safety release module 616 can retrieve the configuration parameters for the safety release turnarounds 618 from the recipe database 608. In another example, a user inputs the configuration parameters directly into the monitoring station 604 for the safety release module 616.

The monitoring station 604 can optionally use machine learning to adjust the configuration parameters of the safety release turnarounds 618 to minimize the down time of the production line 602. For example, the monitoring station 604 can track the frequency of jams in the cooler 614 for particular configurations of the safety release turnarounds 618. The monitoring station 604 can use the tracking information to predict configuration parameters that will minimize the downtime of the production line 602.

The monitoring station 604 includes one or more sensor modules 620 that receive input from one or more sensors 622 located in the production line 602. For example, the sensor modules 620 receive input from the sensors 622 via the network 606. The sensors modules 620 analyze the input received from the sensors 622 that are associated with the respective module.

For example, the sensor modules 620 determine if an event has occurred that the module is monitoring for. In one example, the sensor modules 620 determine if pressed dough balls are moving along the production line 602. In another example, the sensor modules 620 identify images of pressed dough balls moving along the production line 602.

In certain implementations, the sensor modules 620 are physically located in monitoring station 604. In some implementations, sensor modules 620 are physically located in the production line 602, such as installed in one or more of the sensors 622. In other implementations, the sensor modules 620 are physically located in both the monitoring station 604 and the production line 602. For example, the sensor modules 620 associated with photoeyes are physically located in the monitoring station 604 and the sensor modules 620 associated with cameras are physically located in the respective cameras.

The sensors 622 can include multiple types of sensors. In one example, a photoeye is physically located in the cooler 614. In another example, a camera is physically located outside of the cooler 614. For example, the camera monitors a conveyor belt that feeds pressed dough balls into the cooler 614.

In some implementations, each of the sensor modules 620 corresponds to a single type of sensor. For example, there is a single sensor module for all mechanical sensors, and a single sensor module for all photoeyes included in the production line 602.

The sensor modules 620 can include a side door sensor module that receives sensory data from a side door sensor included in the sensors 622. For example, a side door sensor module can monitor the level of tension provided by a side door sensor implemented as a steel cable tension sensing device. When the sensed tension value changes by more than a threshold value, the side door sensor module informs monitoring station 604 that a side door has possibly opened and the monitoring station 604 shuts down the production line 602 (e.g., one or more conveyors in the cooler 614 are turned off). Alternatively, a portion of the production line 602 is stopped.

The sensor modules 620 can include an end door sensor module that receives sensory data from an end door sensor included in sensors 622. For example, an end door sensor module can monitor the status of a lock provided by an end door sensor implemented as a lock position sensing device. When an unlocked position is sensed, the end door sensor module informs the monitoring station 604 that an end door is opened and the monitoring station 604 shuts down the production line 602. Alternatively, the monitoring station 604 can stop a portion of the production line 602.

The sensor modules 620 can include a photoeye sensor module that receives sensory data from a photoeye sensor included in the sensors 622. For example, a photoeye sensor can monitor the status of a photobeam emitted by a photoeye included in the cooler 614. When the photobeam is disrupted (e.g., when a pressed dough ball is resting on a conveyor in a position that will inhibit processing in the production line 602), the photoeye sensor module informs the monitoring station 604 that a safety release turnaround is potentially jammed, and the safety release module 616 can send a message to retract the safety release turnarounds 618 to discharge a jam. Alternatively, a subset of the safety release turnarounds 618 are rotated and retracted to discharge the jam.

The sensor modules 620 include a discharge sensor module that receives sensory data from a discharge sensor included in the sensors 622. For example, the discharge sensor module monitors the mass of a portion of the production line as measured by the discharge sensor implemented as a digital scale to determine when products removed from the cooler 614 should be carried away from the production line 602. In one example, when the measured mass value exceeds a threshold value, the monitoring station 604 activates an alarm indicating that removal of a removed product cart is required. In another example, the monitoring station 604 activates a conveyor belt that transfers discharged pressed dough balls to a different part of the food processing facility from the production line 602.

The sensor modules 620 can include a camera sensor module that receives sensory data from a camera sensor included in the sensors 622. For example, the camera sensor module can record the image of pressed dough balls provided by a camera sensor installed within the cooler 614. Alternatively, the camera sensor can be installed over a conveyor belt placed before the cooler 614.

In implementations with the camera sensor module, the monitoring station 604 can include a product analysis module 624. For example, the camera sensor module sends images of pressed dough balls to the product analysis module 624 for image processing. In certain implementations, the camera sensor module and the product analysis module 624 can be the same module.

The product analysis module 624 analyzes the images captured by the camera sensor sent to the camera sensor module to identify pressed dough balls that will potentially cause a jam in the safety release turnarounds 618. When the product analysis module 624 detects an incorrectly formed pressed dough ball (e.g., based on thickness, diameter, shape, or pressed dough balls connected together), the product analysis module 624 sends a message to the safety release module 616 indicating that one or more of the safety release turnarounds 618 should be rotated and retracted to prevent a jam.

In some implementations, the product analysis module 624 is configured to identify differences in color between the pressed dough balls and a conveyor transporting the pressed dough balls. For example, the product analysis module 624 receives parameters indicating the hue, saturation, and value (HSV) of the pressed dough balls so that the product analysis module 624 can easily locate pressed dough balls positioned on the conveyor.

In certain implementations, product analysis module 624 performs detection of incorrectly formed pressed dough balls through diameter analysis. For example, the product analysis module 624 retrieves recipe parameters from a recipe database 608 and compares the retrieved recipe parameters to the estimated dough ball diameter. The recipe parameters indicate the desired diameter values for the pressed dough ball currently being processed by the production line 602.

In other implementations, the recipe parameters can include an over variance threshold value, used when the measured diameter is greater than a desired diameter, and an under variance threshold value, used when the measured diameter is smaller than the desired diameter. The range of permissible values for over variance can be larger than values for under variance, as a larger diameter corresponds to a thinner pressed dough ball, which can be less likely to cause a jam in one of the safety release turnarounds 618.

When the product analysis module 624 identifies a pressed dough ball that does not fall in the required range of diameters, the product analysis module 624 provides a message to the safety release module 616. The safety release module 616 controls the retraction of the safety release turnarounds 618 to prevent the jam of a pressed dough ball in a safety release turnaround and to discharge the pressed dough ball from the cooler 614. The safety release module 616 optionally provides an alert on the monitor 610 to indicate the detection of a pressed dough ball that may cause a jam.

In certain implementations, the product analysis module 624 performs detection of jams in the safety release turnarounds 618 using timing analysis. For example, the product analysis module 624 retrieves recipe parameters from a recipe database 608 and identifies the configured conveyor belt velocity. Using the configured conveyor belt velocity, the product analysis module 624 determines an estimated exit rate of pressed dough balls from the cooler 614 and compares the estimated exit rate to the pressed dough balls exit rate at the output of the cooler 614 based on the output of the sensors 622.

If the estimated exit rate is smaller than the exit rate of the pressed dough balls, the product analysis module 624 can determine that a jam may have occurred. Alternatively, if the product analysis module 624 determines that a pressed dough ball has not left the cooler 614 in predetermined period of time (e.g., based on the estimated exit rate), the product analysis module 624 can determine that a jam may have occurred in the cooler 614.

When the product analysis module 624 detects the absence of a pressed dough ball that does not fall in the required range of timings, the product analysis module 624 provides a message to the safety release module 616. The safety release module 616 provides a message to one or more controllers that instruct actuators attached to the safety release turnarounds 618 to remove the jam and discharge the pressed dough ball from the cooler 614. The safety release module 616 optionally provides an alert on the monitor 610 to indicate the detection of a potential jam in one of the safety release turnarounds 618.

FIG. 6 shows the cooler module 612 and the safety release module 616 as separate modules. In certain implementations, a single module provides the functionality of the cooler module 612 and the safety release module 616.

In one example, the monitoring station 604 is physically separate from the production line 602. For example, the monitoring station 604 is located in a different building than the building housing the production line 602. Alternatively, the monitoring station 604 is installed within the production line 602. For example, monitoring station 604 is integrated within the cooler 614 or an operating station in the production line 602.

Figure 7:
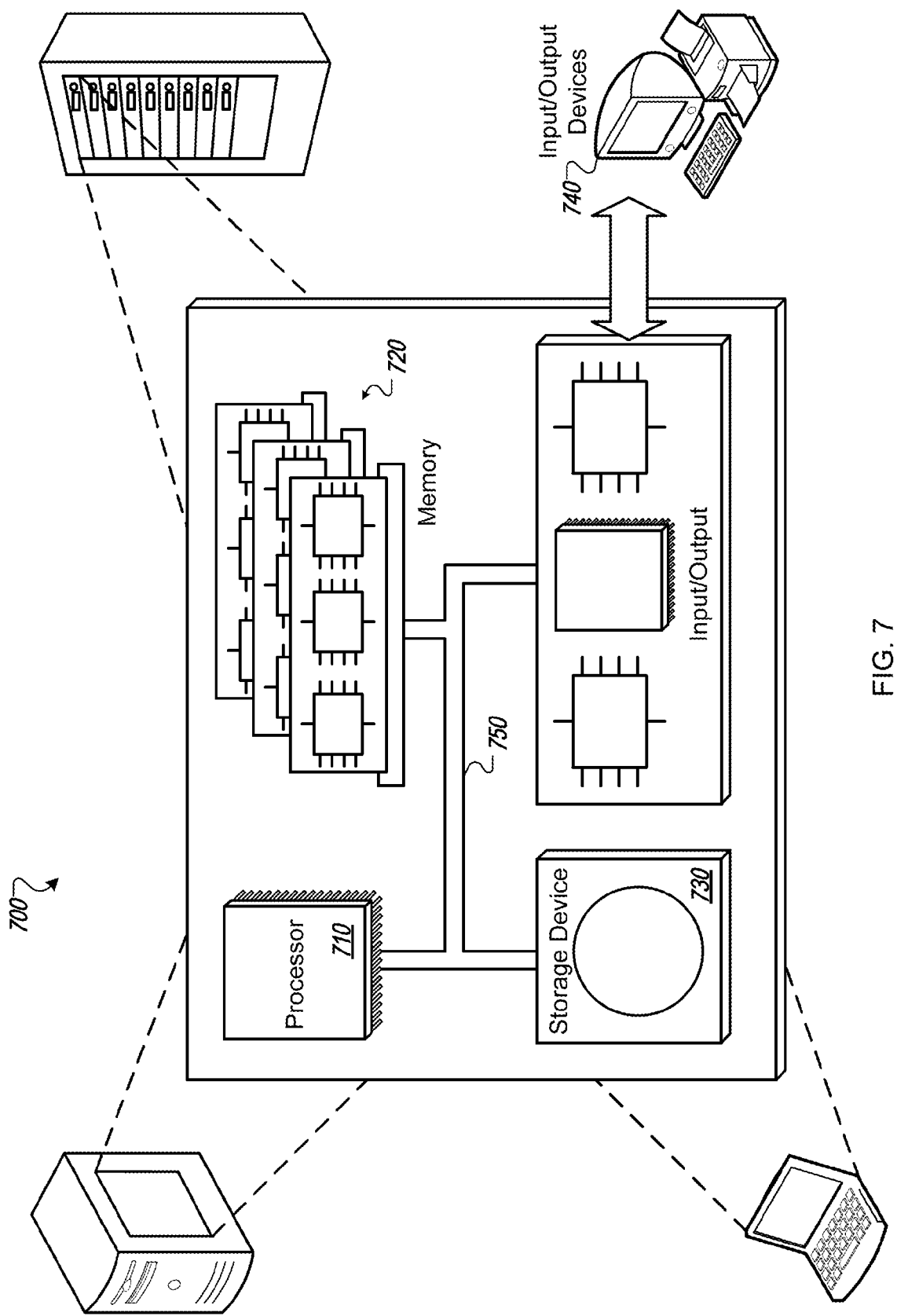
FIG. 7 is a block diagram of a computing system optionally used in connection with computer-implemented methods described in this document.

FIG. 7 is a schematic diagram of a generic computer system 700. The system 700 is optionally used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 is optionally a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A system comprising:
   at least one conveyor pair including an upper conveyor and a lower conveyor rotating in opposite directions and vertically disposed with respect to one another, the lower conveyor being adapted to receive a first comestible conveyed by the upper conveyor;
   a door that restricts access to the at least one conveyor pair when the door is in an operative position;
   a first release turnaround comprising a surface that receives the first comestible from the upper conveyor and directs the first comestible to the lower conveyor; and
   a first mount coupled to the first release turnaround that allows the first release turnaround to actuate to permit ejection of a second comestible from the system while the door is in the operative position.

2. The system of claim 1, wherein the second comestible is a defective comestible, the system further comprising:
   a sensor to detect a characteristic of the defective comestible before the defective comestible reaches the first release turnaround; and
   a controller to receive input from the sensor and to generate a defect signal, wherein the controller prompts an actuator or a user to actuate the first release turnaround, based on the defect signal, so as to discharge the defective comestible from the system.

3. The system of claim 1, wherein the first release turnaround remains opened for between about thirty to about sixty seconds to permit ejection of the second comestible.

4. The system of claim 1, further comprising:
   one or more additional release turnarounds; and
   one or more additional mounts, wherein each of the one or more additional release turnarounds couples with a corresponding mount from the one or more additional mounts that allows actuation of the respective release turnaround at substantially the same time as the first release turnaround to permit ejection of the second comestible from the system.

5. The system of claim 1, further comprising:
   a sensor to detect an absence of a comestible for more than a predetermined period of time; and
   a controller that receives input from the sensor indicating the absence of a comestible for more than the predetermined period of time and prompts a user or an actuator to actuate the first release turnaround.

6. The system of claim 1, further comprising:
a sensor to detect that a third comestible has remained stationary in the system for more than a predetermined period of time; and
a controller that receives input from the sensor indicating that the third comestible has remained stationary in the system for more than the predetermined period of time and prompts a user or an actuator to actuate the first release turnaround.

7. The system of claim 1, wherein a portion of the first release turnaround is accessible while the door is in the operative position.

8. The system of claim 7, wherein the portion of the first release turnaround comprises a handle.

9. The system of claim 1, wherein:
the first mount comprises a slot to permit rotation and translation of the first release turnaround relative to the mount; and
the first release turnaround comprises a pivot coupled to the slot that permits rotation and translation of the release turnaround to permit ejection of the second comestible from the system while the door is in the operative position.

10. The system of claim 9, wherein the slot permits translation in a direction substantially parallel to a longitudinal axis of the upper or lower conveyor direction.

11. A system comprising:
at least one conveyor pair including an upper conveyor and a lower conveyor traveling in the opposite directions and vertically disposed with respect to one another, the lower conveyor being adapted to receive a plurality of comestible products conveyed by the upper conveyor, wherein the plurality of comestible products comprises an atypical comestible product; and
a first release turnaround comprising a surface that receives the plurality of comestible products from the upper conveyor and directs the plurality of comestible products to the lower conveyor;
a sensor to detect the atypical comestible product before the atypical comestible product reaches the first release turnaround; and
a controller that receives input from the sensor indicating the atypical comestible product and prompts an actuator or a user to actuate the first release turnaround, based on the prompt, in a direction substantially parallel to a longitudinal axis of the upper or lower conveyor so as to discharge the atypical comestible product from the system.

12. The system of claim 11, further comprising:
an access door that restricts access to the at least one conveyor pair while the access door is in an operative position; and
a mount coupled to the first release turnaround that allows the first release turnaround to actuate to discharge the atypical comestible product while the access door remains closed and the at least one conveyor pair continues to move.

13. The system of claim 12, wherein the first release turnaround remains in an actuated position for at least about thirty seconds to discharge the comestibles.

14. The system of claim 12, wherein the actuating further comprises pivoting.

15. The system of claim 14, wherein the first release turnaround is pivotable between about 20 and about 60 degrees.

16. The system of claim 12, wherein the mount allows the first release turnaround to actuate between about 2 and about 12 inches between a first operational position and a second operational position.

17. The system of claim 12, further comprising:
one or more additional release turnarounds; and
one or more additional mounts, wherein each of the one or more additional release turnarounds couples with a mount from the one or more additional mounts that allows actuation of the respective release turnaround at substantially the same time as the first release turnaround to discharge the atypical comestible product from the system.

18. A system comprising:
at least one conveyor pair including an upper conveyor and a lower conveyor traveling in opposite directions and vertically disposed with respect to one another, the lower conveyor being adapted to receive a plurality of comestible products conveyed by the upper conveyor;
a first release turnaround comprising a surface that receives the plurality of comestible products from the upper conveyor and directs the plurality of comestible products to the lower conveyor;
a sensor to detect an absence of a comestible product for more than a predetermined period of time; and
a controller that receives input form the sensor indicating the absence of a comestible product for more than the predetermined period of time and prompts an actuator or a user to actuate the first release turnaround in a direction substantially parallel to a longitudinal axis of the upper or lower conveyor so as to discharge one or more comestible products from the system.

19. The system of claim 18, further comprising:
an access door that restricts access to the at least one conveyor pair while the access door is in an operative closed position; and
a mount coupled to the first release turnaround that allows the first release turnaround to actuate to permit the discharge of a comestible product from the system while the access door is in the operative closed position and the at least one conveyor pair continues to move.

20. The system of claim 18, further comprising:
one or more additional release turnarounds; and
one or more additional mounts, wherein each of the one or more additional release turnarounds couples with a mount from the one or more additional mounts that allows actuation of the respective release turnaround at substantially the same time as the first release turnaround to discharge the one or more comestible products from the system.

* * * * *

UNITED STATES PATENT AND TRADEMARK OFFICE
CERTIFICATE OF CORRECTION

PATENT NO. : 8,662,313 B2  Page 1 of 1
APPLICATION NO. : 13/187396
DATED : March 4, 2014
INVENTOR(S) : Pedro Armando Arevalo and Glenn A. Shelton It is certified that error appears in the above-identified patent and that said Letters Patent is hereby corrected as shown below:

In the Claims:

Column 27, line 31, (Claim 11, line 3), please delete "the".

Signed and Sealed this
Tenth Day of June, 2014

Michelle K. Lee
*Deputy Director of the United States Patent and Trademark Office*